United States Patent
Horishita et al.

(10) Patent No.: US 6,534,997 B1
(45) Date of Patent: Mar. 18, 2003

(54) APPARATUS AND A METHOD FOR LOCATING A FAULT OF A TRANSMISSION LINE

(75) Inventors: Masakazu Horishita, Yokohama (JP); Kazunari Tsubaki, Kawasaki (JP); Kazuyoshi Shimizu, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 196 days.

(21) Appl. No.: 09/685,826

(22) Filed: Oct. 10, 2000

(30) Foreign Application Priority Data

Nov. 8, 1999 (JP) ............................. 11-317366

(51) Int. Cl.[7] .......................... G01R 31/11; G01N 21/00
(52) U.S. Cl. ........................ 324/534; 324/533; 356/73.1
(58) Field of Search ................................. 324/534, 531, 324/532, 533, 535, 536, 95, 527, 528, 636, 642, 96, 616; 356/73.1

(56) References Cited

U.S. PATENT DOCUMENTS 5,187,362 A * 2/1993 Keeble .................. 250/227.15
6,028,661 A * 2/2000 Minami et al. ............ 356/73.1

FOREIGN PATENT DOCUMENTS

| JP | 9-152386 | 6/1997 |
|----|----------|--------|
| JP | 9-329526 | 12/1997 |
| JP | 10-239539 | 9/1998 |

* cited by examiner

Primary Examiner—Christine Oda
Assistant Examiner—James Kerveros
(74) Attorney, Agent, or Firm—Katten Muchin Zavis Rosenman

(57) ABSTRACT

Locating a fault of a transmission line in a system which performs bidirectional optical communication between a station-side device and plural subscriber devices and in which a transmission line 1 extending from the station-side device is branched by a branching/coupling device into plural transmission lines 2 each connected to the subscriber devices. The present invention provides a supervisory unit to the transmission line 1 and attenuators to respective transmission lines 2. The supervisory unit emits an optical test signal, observes a reflected signal of the test signal while changing the attenuation of the attenuators and locates the fault based on a return time and a return loss when the test signal returns as a reflected signal.

16 Claims, 19 Drawing Sheets

Station-side Area

Branching Area

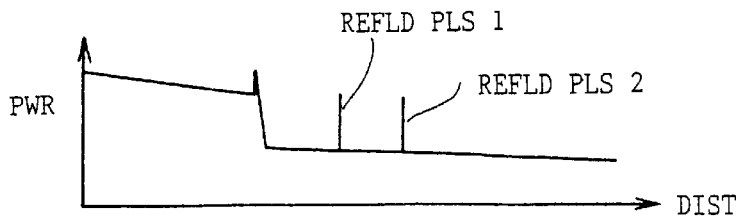
FIG. 13A
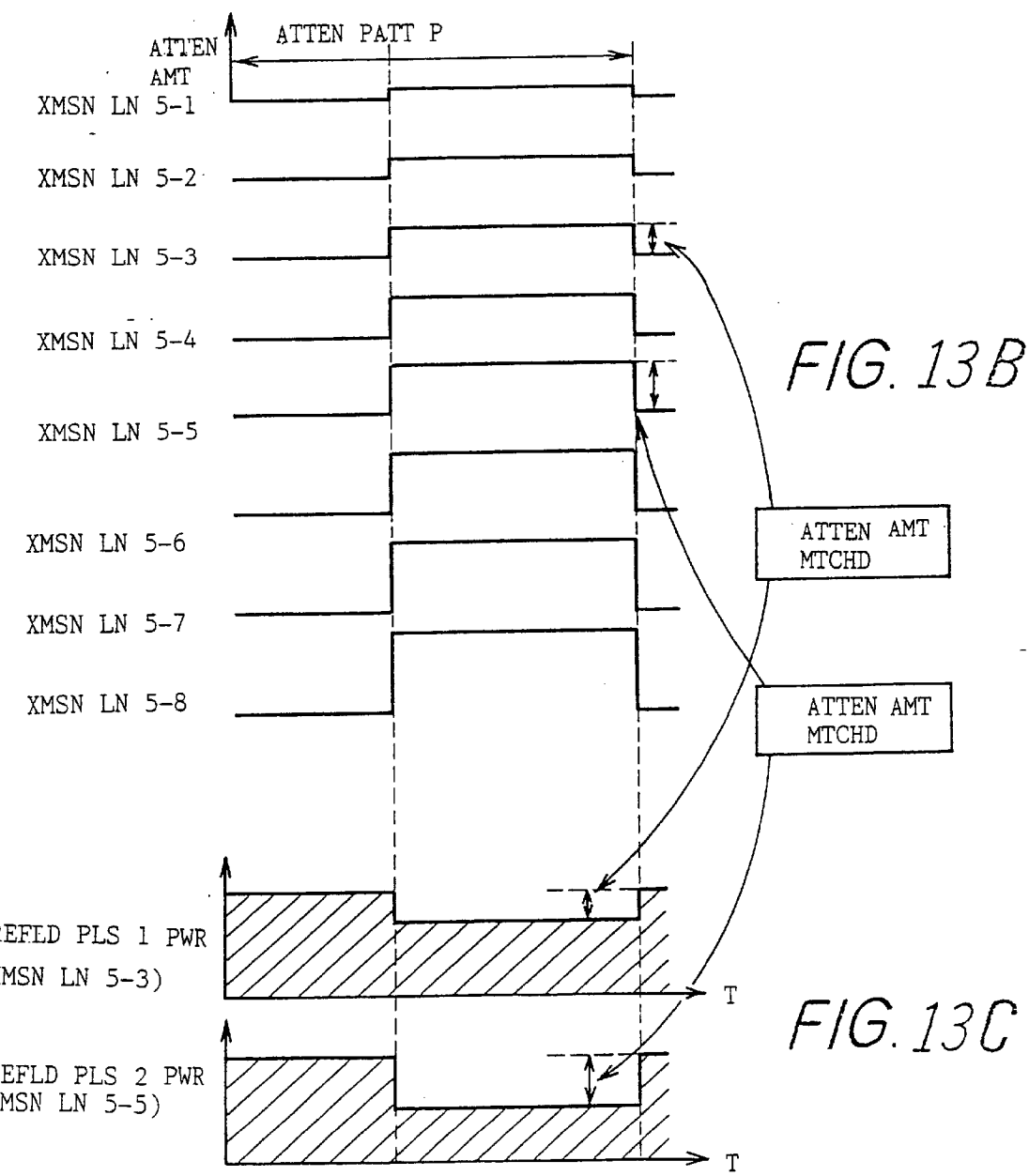
FIG. 13B
FIG. 13C

# APPARATUS AND A METHOD FOR LOCATING A FAULT OF A TRANSMISSION LINE

BACKGROUND OF THE INVENTION

1. Field of the Invention

The present invention relates to locating a deterioration and a fault of a transmission line in a system which transmits a signal, particularly an optical signal bidirectionally between a single device and a group of plural devices.

To develop broadband multimedia services including the Internet, CATV (Cable Television system) and VOD (Video On Demand), it is in great demand to construct an economical, high-speed and broadband access network system. As seen in the FTTH (Fiber To The Home), optical fibers are being utilized for subscriber lines as means to offer large-capacity communication services in order to achieve more high-speed data access and interactive information transmission from terminals at home. However, it is a problem in economical aspect to introduce optical fibers with large transmission capacity into general homes, compared with conventional metallic lines.

Therefore, the PDS (Passive Double Star) system is drawing attention in which an optical fiber extending from a station-side device is branched halfway into plural fibers, each connected with a subscriber device (may be simply called a subscriber) so as to offer bidirectional communication services economically between the station-side device and the subscribers. To perform bidirectional communication in the PDS system, it is necessary to multiplex a downward (station-side device to subscribers) signal with an upward (subscribers to station-side device) signal and to multiplex plural subscriber signals with each other.

The former bidirectional communication is realized by the time division multiplex (TDM) method or the wavelength division multiplex (WDM) method. As for the latter communication, the downward-direction multiplexing is realized by the TDM method in which a subscriber receives all the multiplexed signals transmitted from the station-side device and reads only the information within the time slot assigned to the subscriber. The upward-direction multiplexing is realized by the TDMA method in which the subscribers sharing the station-side device each control the signal transmission timing so that burst signals transmitted do not collide with each other.

In the PDS system which performs bidirectional communications with the transmission line branched halfway into plural lines between the station-side device and the subscribers, an apparatus and a method are in great demand to identify a faulty transmission line and determine the distance of a fault point of the transmission line.

2. Description of the Related Art

Since the refractive index of light changes greatly due to a fault of the transmission line such as a poor connection of connectors, disconnected optical transmission line, a light emitted into an end of a transmission line undergoes a "Fresnel reflection" at the fault point and returns back as a reflected light. Based on this phenomenon, a fault of a transmission line can be located by measuring the time since a test light is emitted into the transmission line until the light returns from the fault point as a reflected light (hereinafter, the time is called propagation time or delay time) and also the power of the reflected light.

FIG. 1 shows a configuration of a conventional supervising system. It shows an optical access system in which a branching/coupling device (abbreviated to BR/CPL in the figure) 3 branches a single transmission line extending from a station-side device (e.g., Subscriber Line Termination equipment, abbreviated to SLT in the figure) 1 into n transmission lines (hereinafter, abbreviated to XMSN LNs in the figures) 5-1, 5-2 to 5-n, each connected with subscriber devices (e.g., Optical Network Unit, abbreviated to ONUs) 2-1, 2-2 to 2-n (may be represented by 2), to perform bidirectional communication between a single device and a group of n devices.

To perform the bidirectional communication, upward signals (from ONU 2-1, 2-2, . . . , 2-n to SLT 1) are multiplexed with downward signals (vice versa) by the time division multiplexing (TDM) or wavelength division multiplexing (WDM).

As for the multiplexing of subscriber signals, the downward communication is performed by the TDM method in which a subscriber receives all the multiplexed signals transmitted from the SLT 1 and reads only the information within the time slot concerned. The upward communication is performed by the TDMA method in which the subscriber devices 2 sharing the station-side device 1 respectively control the signal transmission timing so that burst signals they transmit do not collide with each other.

Conventionally, wavelength division multiplexers (abbreviated to WDMs) 11-1, . . . , 11-n and supervisory units 6-1, . . . , 6-n were provided on the respective transmission lines 5-1, . . . , 5-n immediately after a branching/coupling device 3, viewed from the station-side device 1. The supervisory units 6-1, . . . , 6-n emit into the transmission lines 5-1, . . . , 5-n, a test-light pulse having a wavelength λ2 which is different from wavelength λ1 used for a user service (i.e., for carrying user data).

The respective supervisory units 6-1, . . . , 6-n receive the test-light pulse reflected at a fault point of the transmission lines 5-1, . . . , 2-n and locate the fault point based on the delay time (or propagation time) since the pulse is emitted until the reflected pulse returns to the supervisory units 6-1, . . . , 6-n and based on the power of the reflected-light pulse.

In the conventional method, the supervisory units 6-1, . . . , 6-n were provided in the respective transmission lines 5-1, . . . , 5-n, on the subscriber (ONU) side of the branching/coupling device 3 and adjacent to the station-side device 1 or in the station-side area. Thus, as many supervisory units and WDMs as the number of transmission lines are required, increasing the amount of hardware and therefore the cost of the supervising system. Moreover, since the distance of the transmission lines 5-1, . . . , 5-n between the branching/coupling device 3 and the respective ONU 2-1, . . . , 2-n increases, it is a problem that the probability of a transmission-line fault increases and the reliability of the optical communication system per se decreases.

A probable method to avoid the aforesaid problems by incorporating the supervisory units 6-1, . . . , 6-n with respective WDM 11-1, . . . , 11-n into one unit and placing the unit between the station-side device 1 and branching/coupling device 3, however, has following drawbacks. As is often the case with laying transmission lines to start communication services, if a fault occurs in two or more of transmission lines 5-1, . . . , 2-n, as many reflected-light pulses may return from the fault points. In this case, the supervisory unit can determine the distances to respective fault points but cannot determine a faulty transmission line. Further, if there exist plural fault points at the same distance from the supervisory unit, the reflected-light pulses from the fault points overlap with each other and the fault points may be recognized as one and it cannot be detected that faults occurred in plural transmission lines.

SUMMARY OF THE INVENTION

It is an object of the present invention to provide an ecconomical and reliable apparatus and method for locating a fault of a transmission line.

It is another object of the present invention to provide an apparatus and a method which can properly determine a faulty transmission line and precisely locate a fault point even if a fault occurs in plural transmission lines at the same time and even if a fault occurs in different lines at an equal distance from the supervisory unit.

It is still another object of the present invention to provide an apparatus and a method which can locate a fault of a transmission line, irrespective of whether or not the communication system is being brought into service.

It is a further object of the present invention to provide an apparatus and a method which can locate a fault of a transmission line without disturbing the communication and with a minimum load imposing on the line.

To achieve the above and other objects, the present invention provides an attenuators and a supervisory unit.

(1) In an apparatus for locating a fault of a transmission line in a communication system including a first device which transmits and receives a signal via a first transmission line, a plurality of second devices and a branching/coupling device which branches the first transmission line into a plurality of second transmission lines each connected with the respective second devices, wherein the first device and the plurality of second devices perform bidirectional communication, the attenuators cause individual attenuation to the plurality of second transmission lines. The supervisory unit inserts a test signal in the first transmission line and detects a reflected signal of the test signal. The supervisory unit determines the distance to a fault point based on the time since the test signal is inserted until the reflected signal is detected. The supervisory unit also compares for each of the second transmission lines, the attenuation caused by the attenuators with attenuation of the reflected signal and based on the comparing, determines a faulty one of the second transmission lines.

(2) In the aforesaid apparatus, the attenuators cause individual attenuation to the plurality of second transmission lines based on a specified attenuation condition. The supervisory unit specifies to the attenuators the attenuation condition including timing for causing attenuation to the second transmission lines, inserts a test signal in the first transmission line and detects a reflected signal of the test signal. The supervisory unit determines a distance to a fault point based on the time since the test signal is inserted until the reflected signal is detected. The supervisory unit also compares for each of the second transmission lines, the attenuation caused by the attenuators with attenuation of the reflected signal and based on the comparing, determines a faulty one of the second transmission lines.

BRIEF DESCRIPTION OF THE DRAWINGS

FIGS. 13A–13C illustrate a method for determining a faulty transmission line by using the attenuating pattern 5;

Throughout the above-mentioned drawings, identical reference numerals are used to designate the same or similar component parts.

DESCRIPTION OF THE PREFERRED EMBODIMENTS

Figure 1:
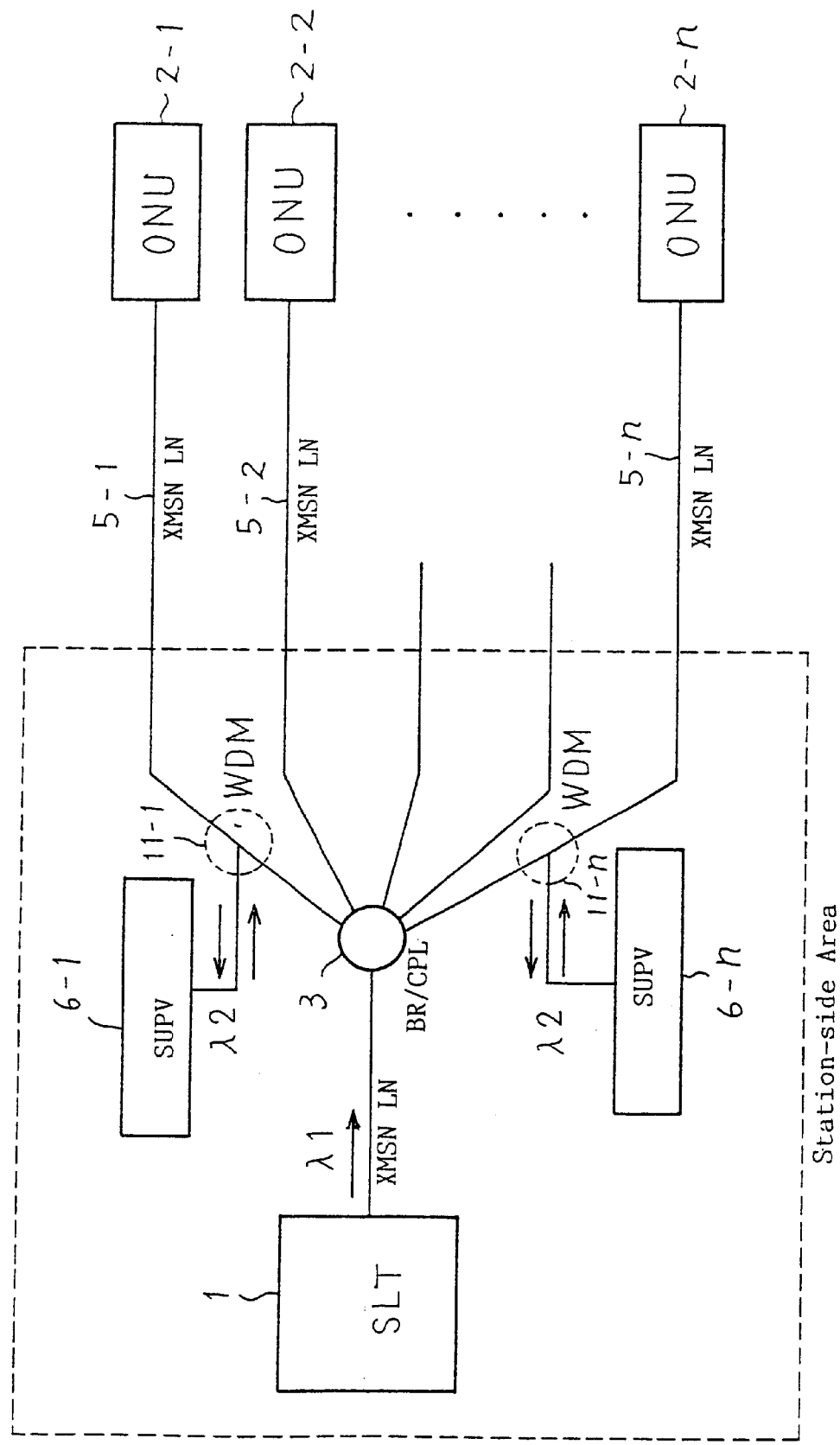
FIG. 1 shows the configuration of a conventional supervising system.
Figure 2:
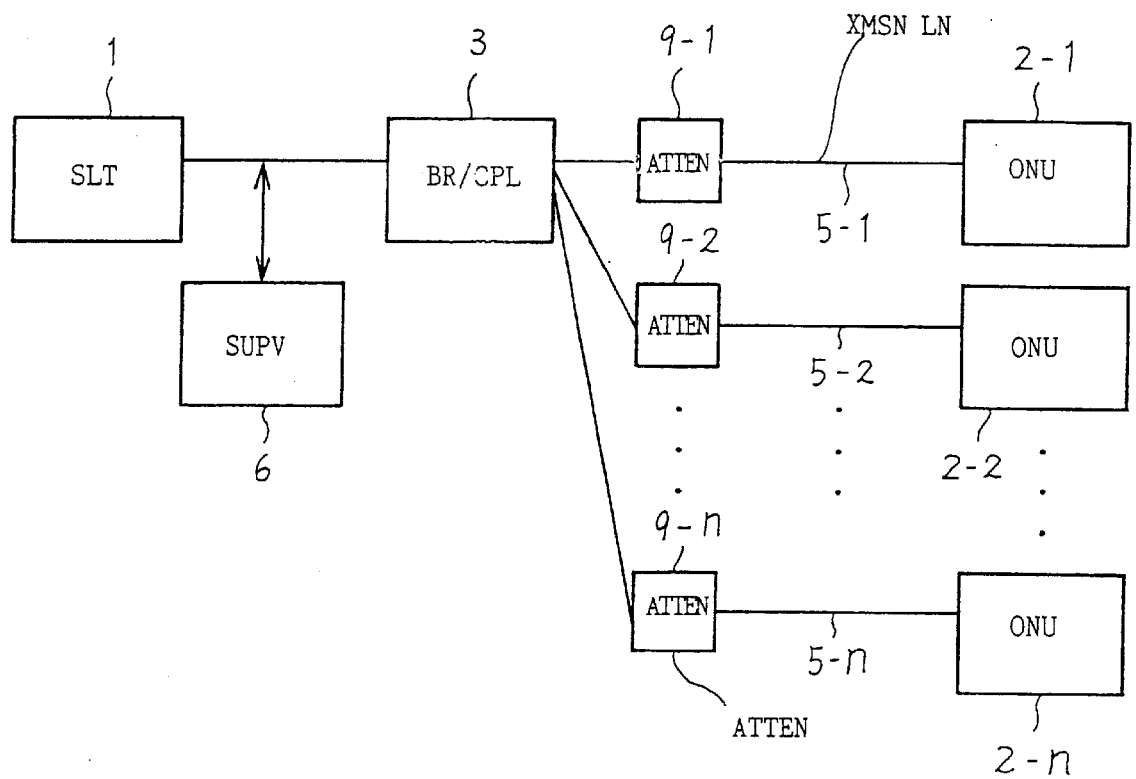
FIG. 2 is a block diagram illustrating a principle of the present invention.

The fault locating device and method of the present invention is explained in detail referring to the figures. FIG. 2 is a block diagram illustrating a principle of the present invention.

In a system to perform bidirectioal optical communication between a station-side device (SLT) 1 and plural subscriber devices (ONUs) 2-1, . . . , 2-n which are connected in common to the station-side device 1 through a brancing/coupling device (BR/CPL) 3, a supervisory unit (SUPV) 6 is connected between the station-side device 1 and the brancing/coupling device 3.

Attenuators (ATTENs) 9-1, . . . , 9-n are provided on the respective optical transmission lines (XMSN LNs) 5-1, . . . , 5-n. The supervisory unit 6 emits a test optical signal into the lines 5-1, . . . , 5-n with attenuation changed individually for the respective attenuators 9-1, . . . , 9-n in a stepwise or turn on/off fashion and observes the time required for the test signal returns as a reflected signal and the attenuated condition of the reflected signal.

With the thus-constructed system, since the amount and condition of attenuation differ depending on the lines, the supervisory unit 6 can determine a faulty one of the transmission lines 5-1, ..., 5-n and the distance to the fault point of the lines 5-1, ..., 5-n.

Figure 3:
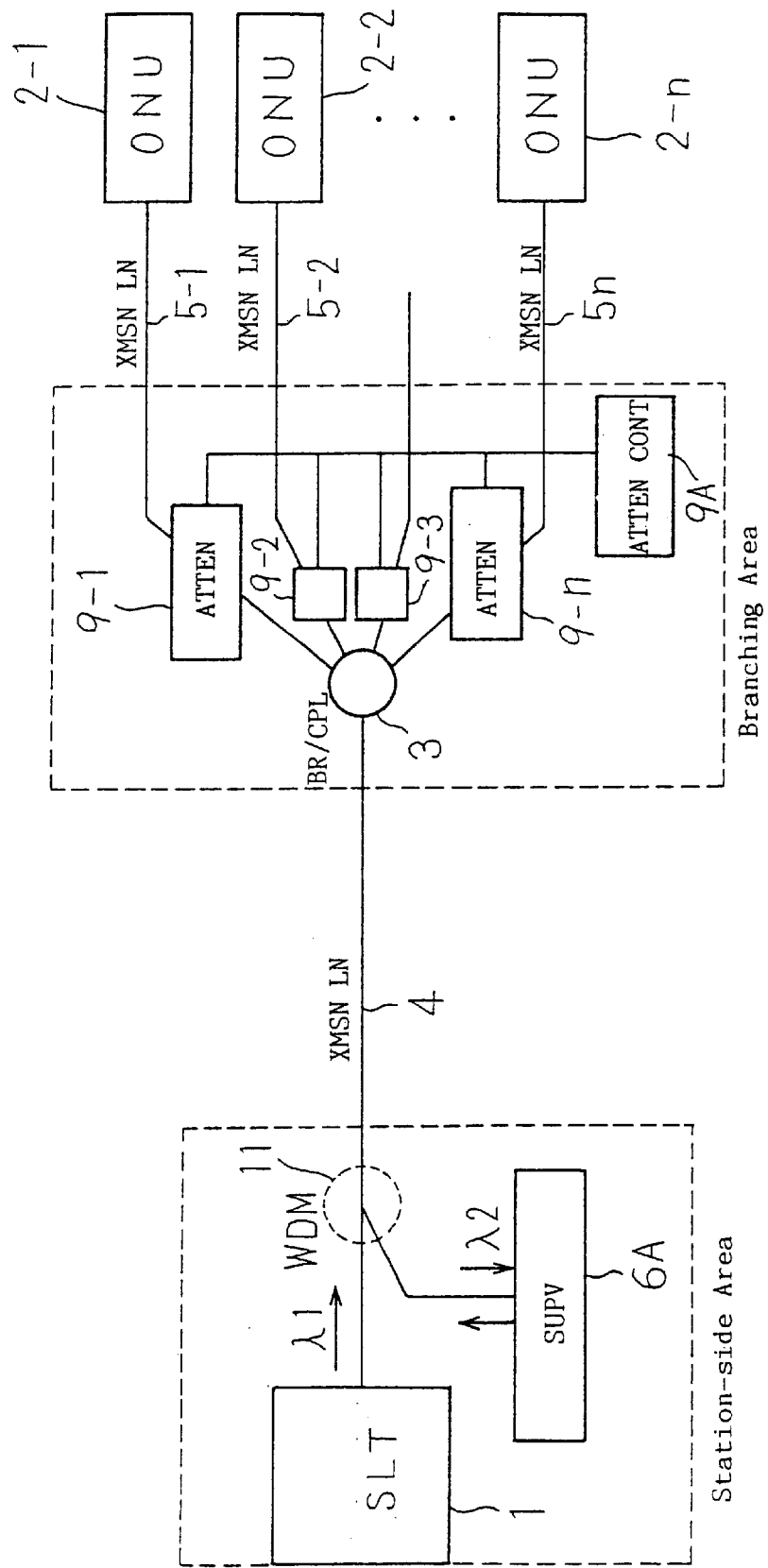
FIG. 3 shows a configuration of the supervising system of the first embodiment of the present invention.

FIG. 3 shows a configuration of the supervising system of the first embodiment of the present invention, in which a branching/coupling device (BR/CPL) 3 branches a single transmission line extending from a station-side device (SLT) 1 into n transmission lines 5-1, ..., 5-n, each connected with subscriber devices (ONUs) 2-1, ..., 2-n, to perform bidirectional communications between a single device and a group of n devices. The branching/coupling device 3 distributes a signal on a single optical transmission line 4 to plural (n in general) optical transmission lines and combines signals on the n optical transmission lines to supply to the single optical transmission line 4.

To realize bidirectional communications, a downward (SLT 1 to ONU 2-1, ..., 2-n) signal and an upward (vice versa) signal are multiplexed by the time division multiplexing (TDM) or wavelength division multiplexing (WDM). As for the multiplexing of plural subscriber (ONU 2-1, ..., 2-n) signals, the downward-direction multiplexing is performed by the TDM method in which a subscriber receives all the multiplexed signals transmitted from the station-side device 1 and reads only the information within the time slot assigned to the subscriber. The upward-direction multiplexing is performed by the TDMA method in which the subscribers sharing the station-side devices 1 each control the signal transmission timing so that burst signals they transmit do not collide with each other.

A wavelength division multiplexer (abbreviated to WDM) 11 is an optical device which combines (or multiplexes) plural optical signals of respectively different wavelengthes to supply to a single transmission line 4. It also separates (or demultiplexes) a signal which has plural signals of different wavelengthes multiplexed on a single transmission line, into plural signals of the different wavelengthes. Here, The WDM 11 performs the above multiplexing and demultiplexing operations on an optical user data signal of wavelength $\lambda 1$ and a test-light pulse of wavelengths $\lambda 2$.

Attenuators (ATTENs) 9-1, ..., 9-n, which are provided on the corresponding transmission lines (XMSN LNs) 5-1, ..., 5-n, cause individual attenuation to the lines 5-1, ..., 5-n. An attenuation controller (ATTEN CONT) 9A sets in the attenuators 9-1, ..., 9-n a predetermined attenuating pattern, element by element, of the amount of attenuation or attenuation on/off condition as shown in later-explained FIG. 9B, for example).

With the thus-constructed supervising system, a supervisory unit 6A can locates a fault of the transmission line by emitting a test-light pulse into the transmission lines 5-1, ..., 5-n through the transmission line 4 and then observing the delay time and the attenuated condition of the test-light pulse as the reflected-light pulse. That is, the supervisory unit 6A can determine the distance to a fault point based on the delay time since the test-light pulse is emitted until a reflected-light pulse returns. It can also determine a faulty one of the transmission lines 5-1, ..., 5-n base on a attenuated condition of the reflected-light pulse. Needless to say, it can locate a fault of the transmission line 4 when the delay time is less than a predetermined time.

By setting time-varying attenuation in the attenuators 9-1, ..., 9-n, the present invention can always locate a fault without causing a trouble to user services, even when the transmission lines 5-1, ..., 5-n are being brought into service, i.e., carrying user data signals.

Figure 4:
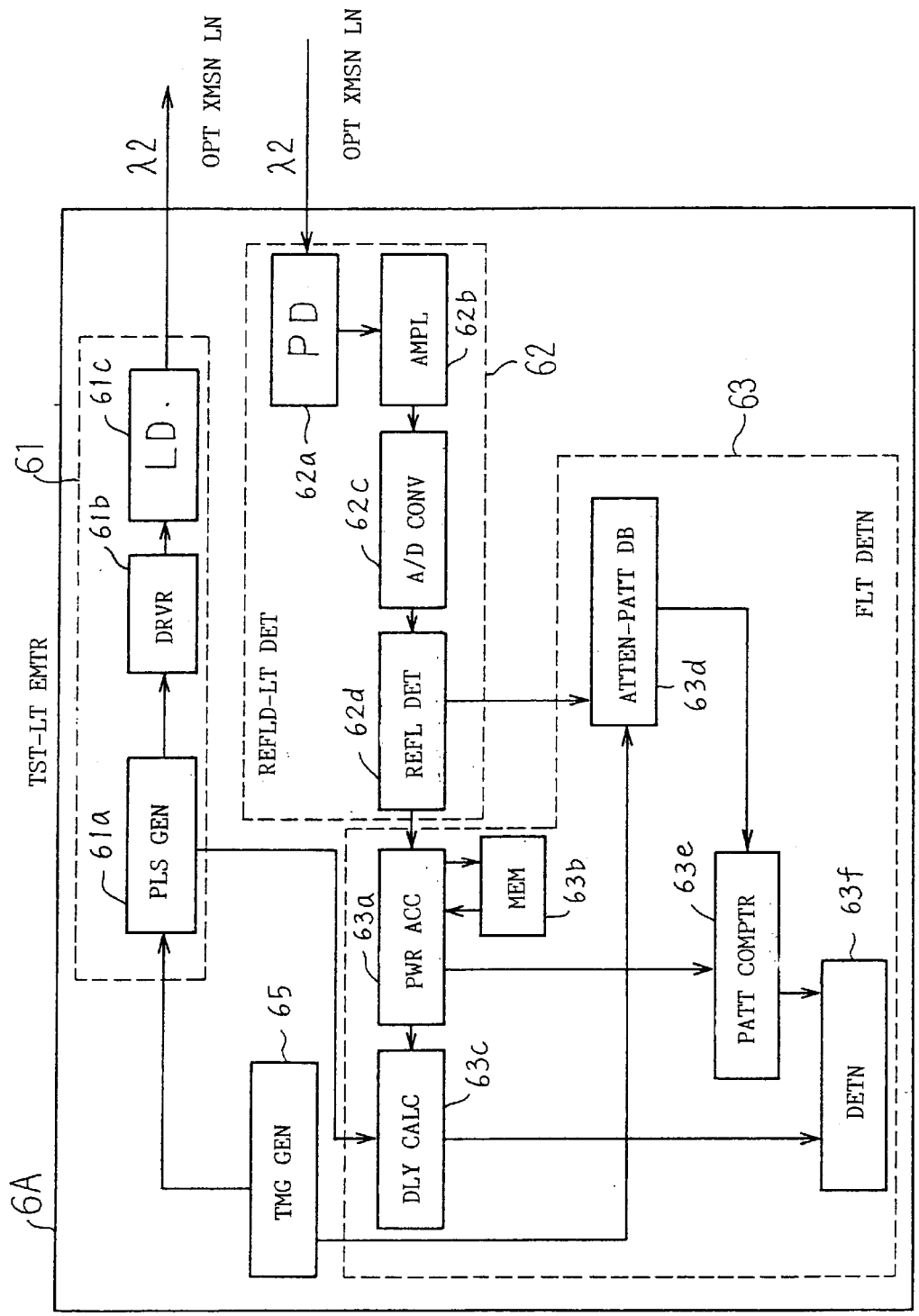
FIG. 4 is a block diagram of a supervisory unit of the first embodiment of the present invention.

FIG. 4 is a block diagram of a supervisory unit of the first embodiment of the present invention. The supervisory unit 6A is composed roughly of a test-light emitter (TST LT EMTR) 61, a reflected-light detector (REFLD-LT DET) 62, a fault determiner (FLT DETN) 63 and a timing generator (TMG GEN) 65.

The test-light emitter 61, which is composed of a pulse generator (PLS GEN) 61a, a driver circuit (DRVR) 61b and a laser diode (LD) 61c, emits a test-light pulse of wavelength $\lambda 2$ differing from wavelength $\lambda 1$ used for user services. The pulse generator 61a generates an electric pulse when activated by a trigger signal from the timing generator 65. The driver circuit 61b and LD 61c electric-to-optical convert the electric pulse into a test-light pulse of wavelength $\lambda 2$ and emits the test-light pulse into the transmission lines 5-1, ..., 5-n. Then, the test-light pulse of wavelength $\lambda 2$ is multiplexed by the WDM 11 with the optical user data signal of wavelength $\lambda 1$ and transmitted to the lines 5-1, ..., 5-n.

The reflected-light detector 62, which is composed of a photodiode (PD) 62a, an amplifier (AMPL) 62b, an A/D converter (A/D CONV) 62c and reflection detector (REFL DET) 62d, detects a reflected-light pulse returning from the transmission lines 5-1, ..., 5-n. It is assumed here that a fault occurs in one or more of the lines 5-1, ..., 5-n.

A fault of the lines 5-1, ..., 5-n can be determined by the delay (or propagation) time for the test-light pulse to return as a reflected-light pulse. The reflected-light pulse of wavelength $\lambda 2$, which occurs at a fault point, propagates through the branching/coupling device 3 and the transmission line 4 and undergoes demultiplexing at the WDM 11 (see FIG. 3), is optical-to-electric converted by the PD 62a. The electric reflected pulse thus-converted is amplified by the amplifier 62b, sampled and digitalized (analog-to-digital converted) by A/D converter 62c. The reflection detector 62d determines whether a transmission-line fault has occurred by comparing the power waveform of the above-obtained reflected-light pulse with that which occurs at the normal time without a fault.

The fault determiner 63, which is composed of a power accumulator (PWR ACC) 63a, a memory (MEM) 63b, a delay calculator (DLY CALC) 63c, an attenuating-pattern database (ATTEN-PATT DB) 63d, a pattern comparator (PATT COMPTR) 63e and determiner (DETN) 63f, determines a faulty transmission line and the distance to a fault point of the faulty line by detecting the changes of the reflected-light power and the timing of the changes.

When the reflection detector 62d of the reflected-light detector 62 detects that a reflected-light pulse has occurred, the power accumulator 63a accumulates in the memory 63b the digitalized values of the reflected-light pulse detected by the reflection detector 62d to prepare an attenuated pattern of the reflected light. The delay calculator 63c determines the distance to the fault point, i.e., the point where the reflected light has occurred, by calculating the delay time from the time the test light is emitted until the reflected-light pulse is received.

Figure 5:
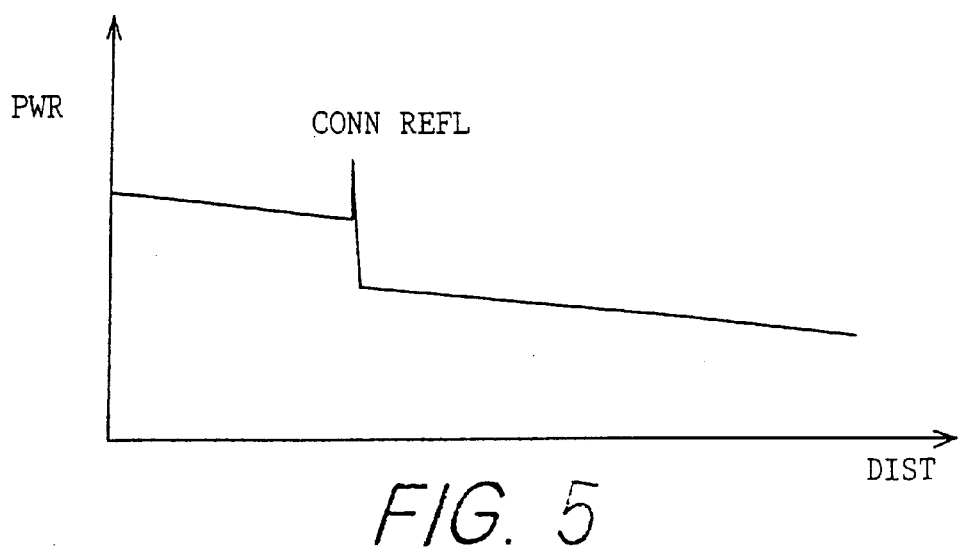
FIG. 5 illustrates a reflected-light power waveform at a normal time.
Figure 6A:
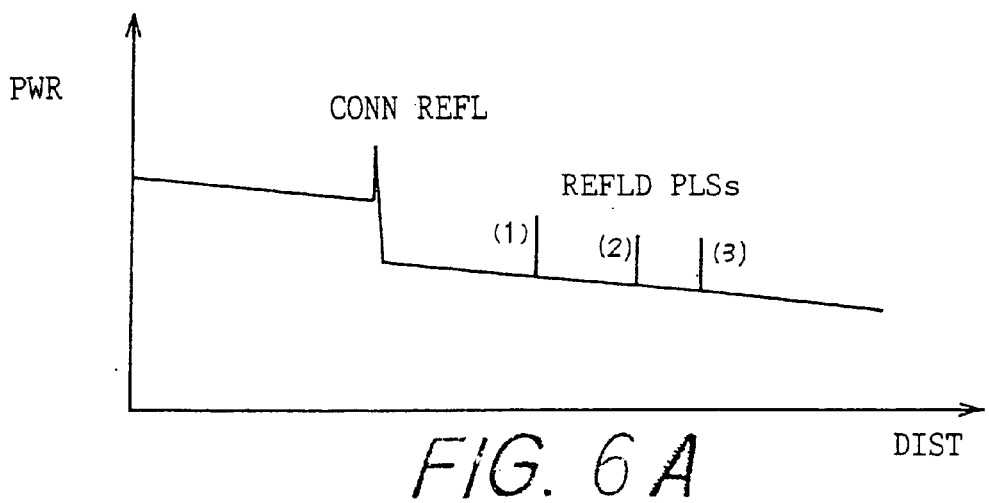
FIGS. 6A–6B illustrate a reflected-light power waveform at an abnormal time.

Next, the function of the supervisory unit 6A to determine a faulty transmission line is explained referring to FIGS. 5, 6A, 6B and 8. FIG. 5 illustrates a reflected-light power waveform at a normal time, in which only a reflection from a connector (CONN REFL) is observed. FIG. 6A illustrates a reflected-light power waveform at an abnormal time when a fault has occurred in a transmission line. The figures show the optical power (PWR) waveforms with respect to the distance (DIST) an optical pulse emitted from the supervisory unit 6A propagates on the transmission line, as observed by e.g., an Optical Time Domain Reflect-meter (OTDR) provided in the supervisory unit 6A.

When there occurs no fault in the transmission lines 5-1, ..., 5-n, a reflected-light pulse does not occur in the waveform input to the supervisory unit 6A as shown in FIG. 5, whereas if a fault occurs in any of the lines 5-1, ..., 5-n when lines are being laid in preparation for opening a business or even when being used for a user service, reflected-light pulses (REFLD PLSs) (1), (2) and (3), for example, occur as shown in FIG. 6A. If a fault occurs in plural ones of lines 5-1, ..., 5-n or there are plural fault points in one of the lines 5-1, ..., 5n, plural reflected-light pulses are observed.

Figure 6B:
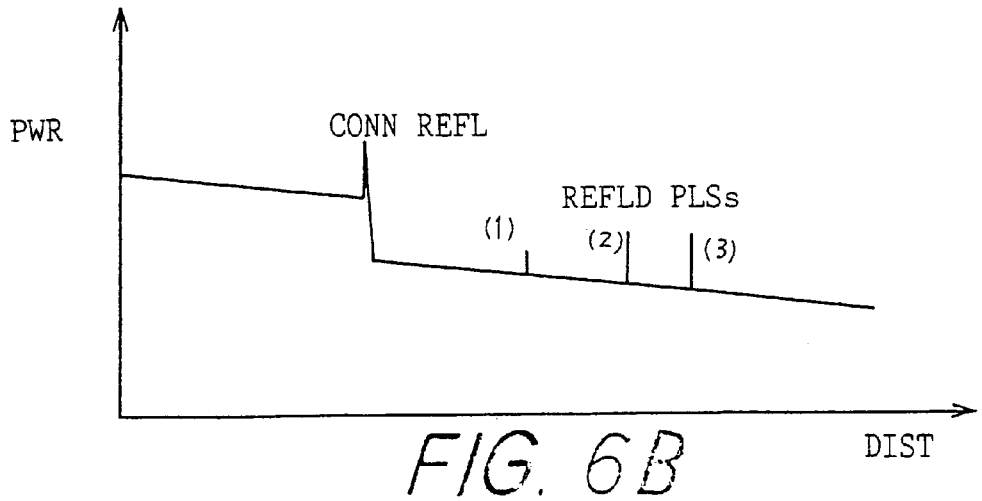

In contrast with the case of FIG. 6A in which attenuation is not caused to a transmission line, FIG. 6B shows a reflected-light power waveform when attenuation is caused to a faulty transmission line, that is, to the transmission line which has caused reflected pulse (1), in which the reflected pulse (1) is observed as attenuated and having a small amplitude.

Figure 9A:
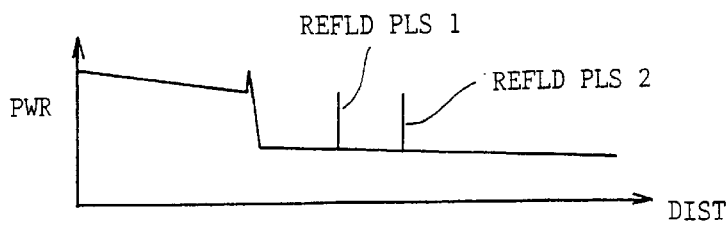
FIGS. 9A–9C illustrate a method for determining a faulty transmission line by using the attenuating pattern 1.
Figure 9B:
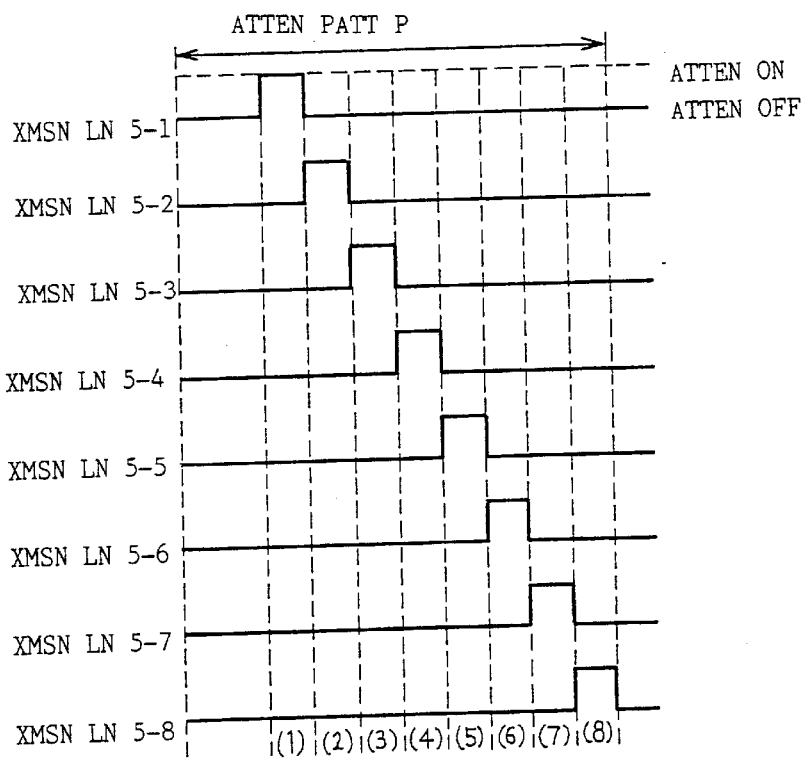

The attenuation controller 9A controls the attenuators 9-1, ..., 9-n so that they each cause individual attenuation repeatedly to the corresponding transmission lines 5-1, ..., 5-n (e.g., attenuation-on/off pattern as shown in FIG. 9B, hereinafter the pattern is called an attenuating pattern). This operation to turn the attenuators on/off based on the attenuating pattern and an operation to emit a test light and receive a reflected light are continuously repeated.

Figure 8:
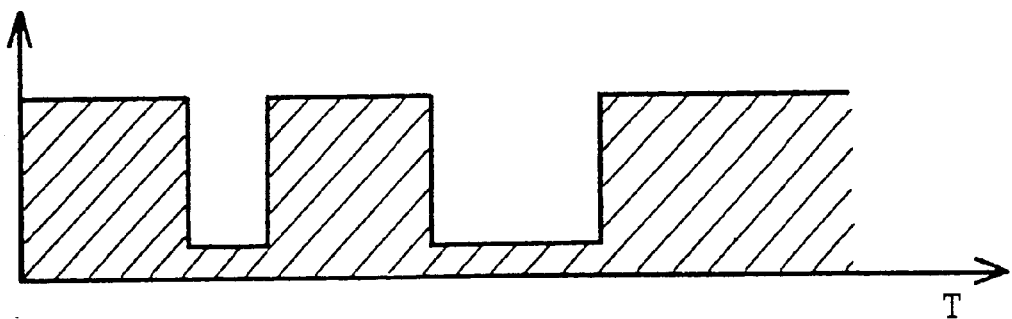
FIG. 8 shows an example of an attenuated pattern of the reflected light.

When a pattern of attenuation (called an attenuating pattern) is caused to a transmission line, a reflected light occurring at a fault point returns to the supervisory unit 6A in an attenuated waveform (called an attenuated pattern) peculiar to the line, as shown in FIG. 8. FIG. 8 shows an example of an attenuated pattern of the reflected light, in terms of a reflected-light power waveform (REFLD LT PWR) vs time (T) for a particular transmission line. It indicates that there exist two fault points in a transmission line, because the waveform shows two attenuated portions with respect to time, when a particular attenuating pattern is provided to the line.

Accordingly, the pattern comparator 63e of the supervisory unit 6A compares the reflected-light attenuated pattern accumulated in the memory 63b with the attenuating pattern previously stored in the attenuating pattern database 63d to determine the faulty line. Thus, the determiner 63f determines a faulty transmission line and the distance to a fault point of the faulty line.

Figure 7:
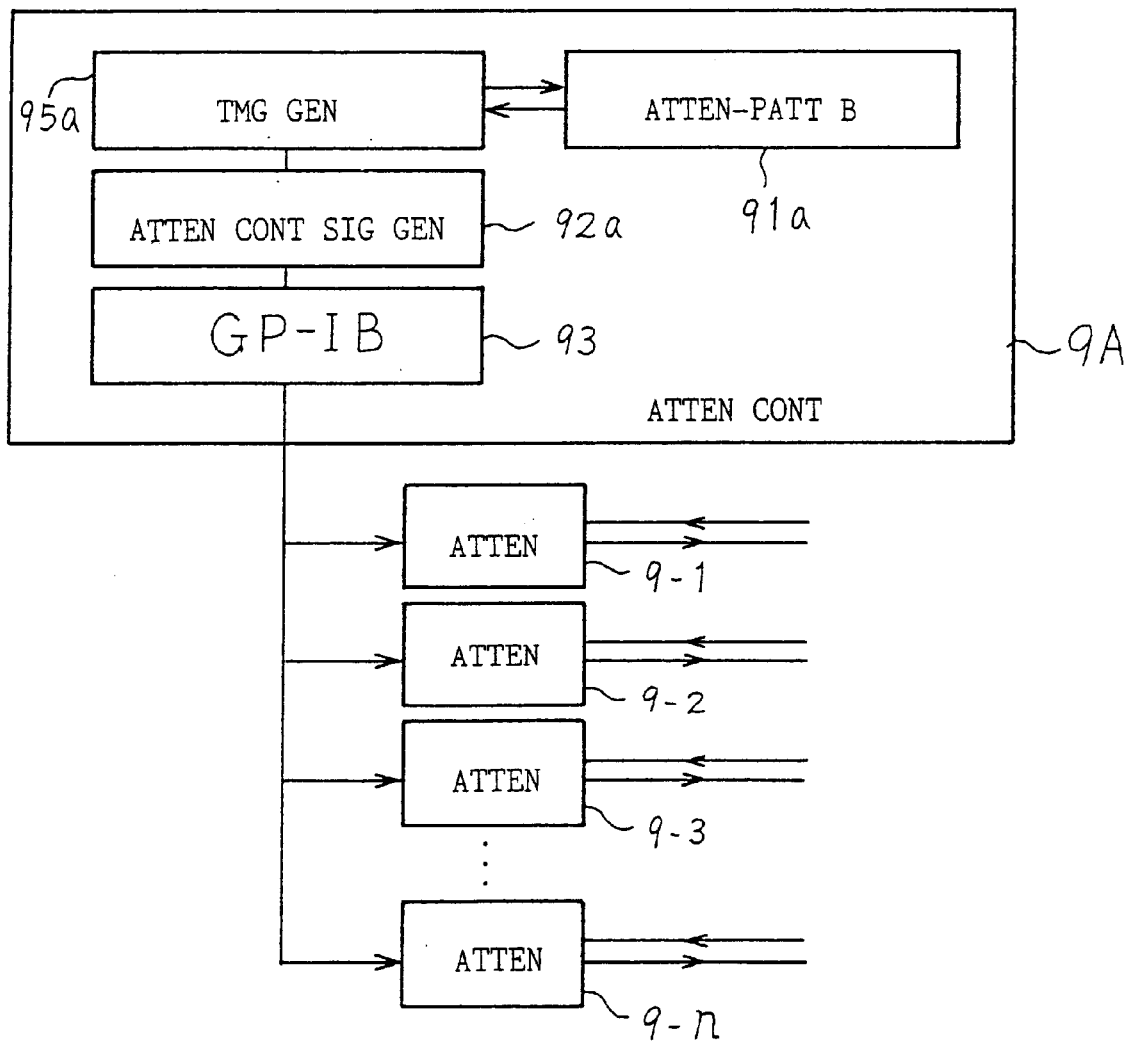
FIG. 7 is a block diagram of an attenuation controller of the first embodiment of the present invention.

FIG. 7 is a block diagram of an attenuation controller of the first embodiment of the present invention. The attenuation controller 9A, which is composed of a timing generator (TMG GEN) 95a, an attenuating-pattern database (ATTEN-PATT DB) 91a, an attenuator control signal generator (ATTEN CONT SIG GEN) 92a and an interface (named GP-IB) 93, controls the attenuators 9-1, ..., 9-n so as to provide a predetermined attenuating pattern to the corresponding transmission lines.

The timing generator 95a reads an attenuating pattern (e.g., the pattern of FIG. 9B) from the attenuating-pattern database 91a at a predetermined timing (e.g., in synchronization with the test-light pulse emitted from the supervisory unit 6A, as explained later with FIGS. 9A–9C).

The attenuator control signal generator 92a generates an attenuator control signal based on the read attenuating pattern and outputs the attenuator control signal to the attenuators 9-1, ..., 9-n through the GP-IB 96. In the example of FIG. 9B, it outputs attenuating pattern elements (1)–(8) sequentially to the attenuators 9-1, ..., 9-n to set the attenuating pattern read from the attenuating-pattern database 91a in the attenuators 9-1, ..., 9-n.

The methods of the present invention to determine a faulty transmission line using attenuating patters are explained. FIGS. 9A–9C illustrate a method for determining a faulty transmission line by using the attenuating pattern 1. FIG. 9A shows the power (PWR) waveform observed by the supervisory unit 6A, of the reflected light with respect to the distance (DIST) on the transmission line when a fault has occurred in lines 5-3 and 5-5, for example, of the transmission lines 5-1, ..., 5-8.

It is assumed, for example, that test-light pulses having a pulse width of 10 nanoseconds to 10 microseconds are emitted at a time period of 1 millisecond from the supervisory unit 6A to the transmission line 4. Here, 1 millisecond is the time required for the test-light pulse to travel the transmission line long enough for practical use and return as the reflected-light pulse.

FIG. 9B shows the attenuating pattern 1, to be provided to 8 transmission lines 5-1, ..., 5-8 or to be set in attenuators 9-1, ..., 9-8, within an attenuation pattern period (ATTEN PATT P). (Here, a combination of attenuation-ON/OFF or attenuation-present/absent in each of rows (1)–(8) is called an element of the attenuating pattern 1.)

The attenuation controller 9A sets an attenuating pattern element (e.g., element (1)) in the attenuators 9-1, ..., 9-8 for a predetermined time (e.g., 1 second) and repeats this operation for all the elements (e.g., elements (1)–(8)). The supervisory unit 6A emits test-light pulses for a predetermined period (e.g., for 10 seconds in the example). When setting the attenuating pattern 1, a synchronization is taken between the supervisory unit 6A and the attenuation controller 9A such that the controller 9A starts the above operation a predetermined time (e.g., 1 second) after receiving the first test-light pulse and after all the elements have been sequentially set, turns off all the attenuators 9-1, ..., 9-8.

Figure 9C:
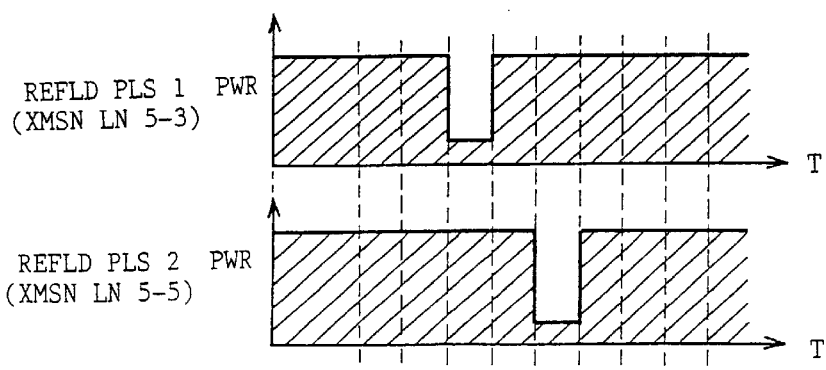

FIG. 9C shows the power waveforms of the reflected-light pulse when a fault has occurred in the lines 5-3 and 5-5, as observed at the supervisory unit 6A. The power of each reflected-light pulse is recognized to be attenuated only when attenuation is caused to the lines 5-3 and 5-5.

The supervisory unit 6A can recognize the transmission lines 5-3 and 5-5 as faulty by comparing the attenuated timing (or attenuated pattern) of the reflected-light power and the attenuating timing (or attenuating pattern) caused to the transmission lines 5-1, ..., 5-8. That is, the reflected-light pulses (REFLD PLSs) 1 and 2 in FIG. 9A are recognized to be attenuated (i.e., having a small amplitude) at time (3) and (5), respectively in FIG. 9C.

Figure 10A:
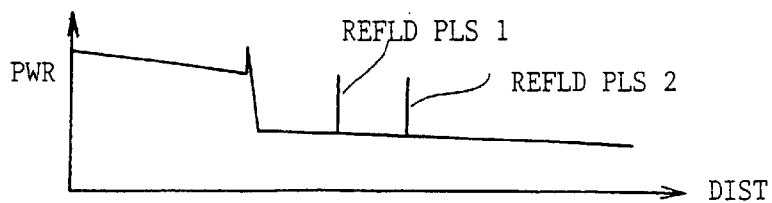
FIGS. 10A–10C illustrate a method for determining a faulty transmission lined by using the attenuating pattern 2.
Figure 10B:
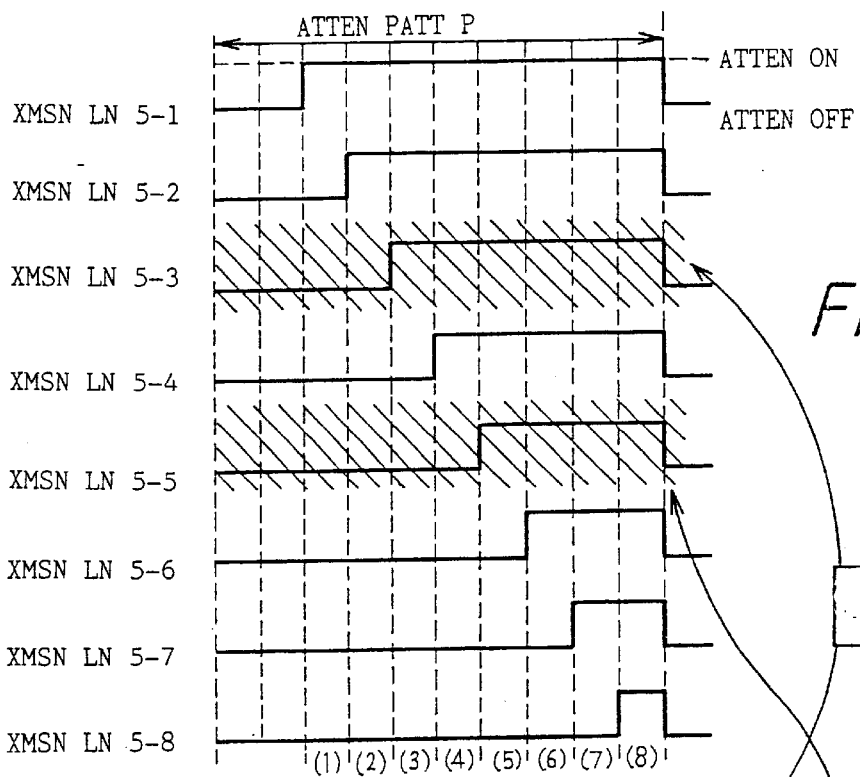
Figure 10C:
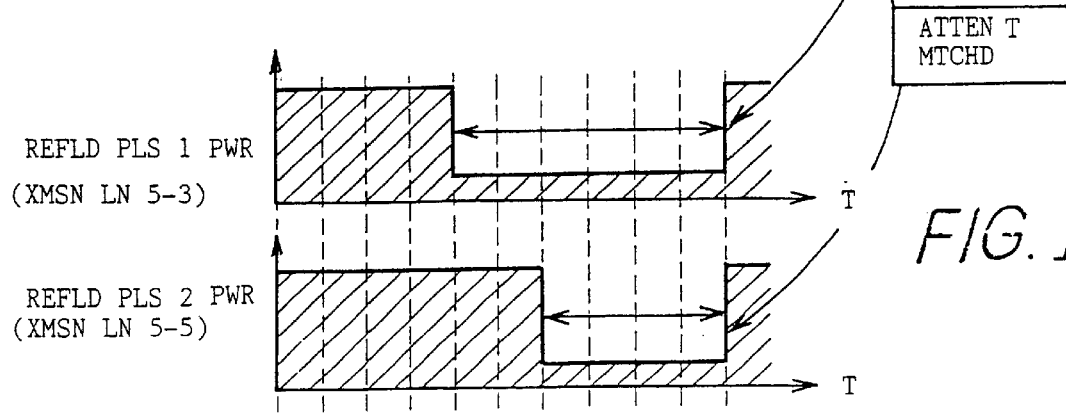

FIGS. 10A–10C illustrate a method for determining a faulty transmission line by using the attenuating pattern 2. FIG. 10A shows the power waveform of the reflected light under the same condition as in FIG. 9A. FIG. 10B shows the attenuating pattern 2.

The attenuation controller 9A sequentially sets the attenuating pattern elements (1)–(8) of the attenuating pattern 2 in the attenuators 9-1, ..., 9-8 by on/off-controlling the attenuators for the time determined by the attenuation-starting and -duration time and thus causing attenuation to the lines 5-1, ..., 5-8 as shown in FIG. 10B. In setting attenuating pattern 2, synchronization is taken between the attenuators 9-1, ..., 9-8 and the supervisory unit 6A in the same way as explained in connection with FIG. 9B. Thus, the attenuating pattern 2 is provided to the lines by continuously setting the attenuating pattern elements (1)–(8) in the attenuators.

FIG. 10C shows the power waveforms of the reflected-light pulse when a fault has occurred in the transmission lines 5-3 and 5-5, as observed at the supervisory unit 6A. Accordingly, the supervisory unit 6A compares the time (ATTEN T) in which the power of the reflected light has attenuated with the time (ATTEN T) in which an attenuation has been caused to the lines 5-1, . . . , 5-8 and on a match, determines that the transmission lines 5-3 and 5-5 are faulty.

Figure 11A:
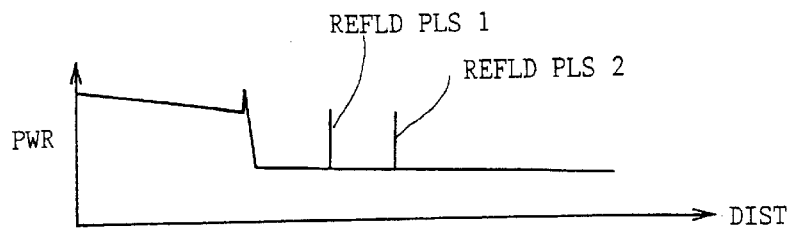
FIGS. 11A–11C illustrate a method for determining a faulty transmission line by using the attenuating pattern 3.
Figure 11B:
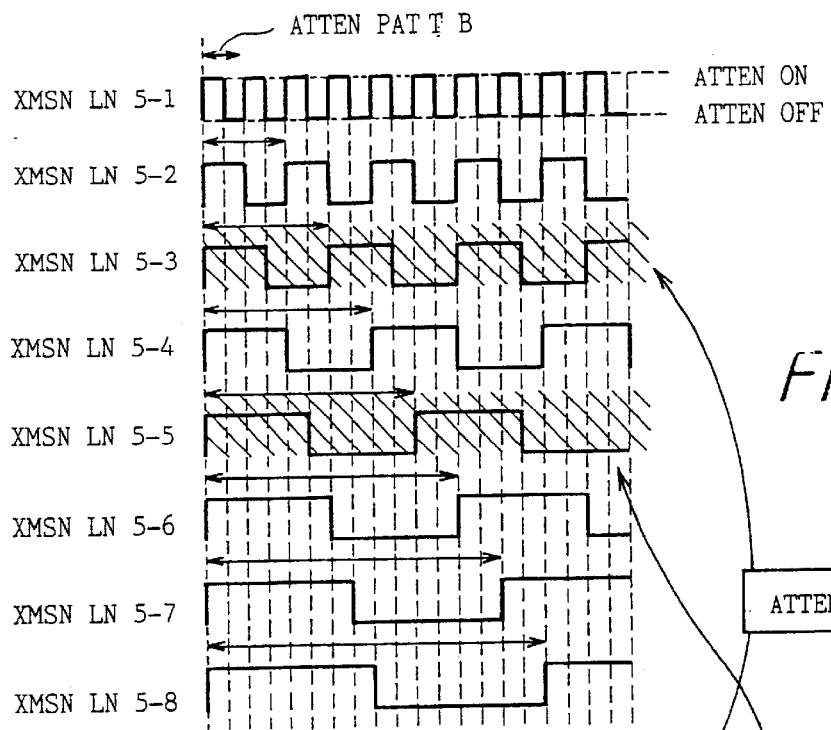
Figure 11C:
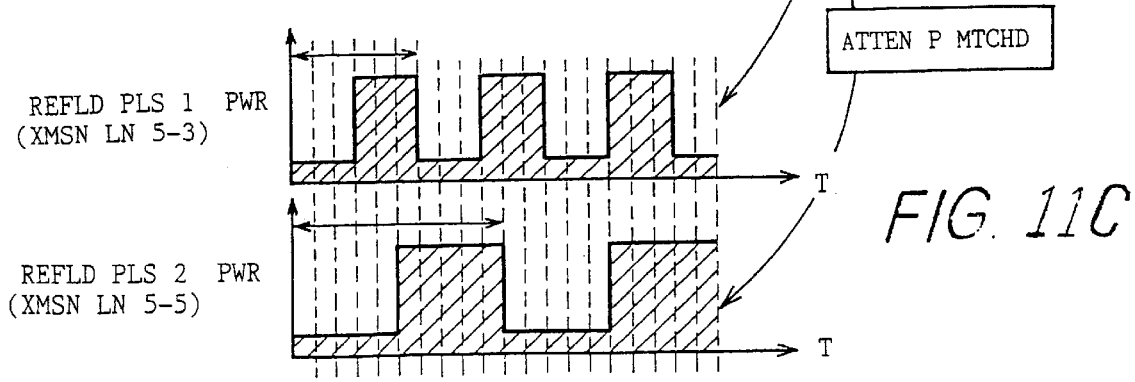

FIGS. 11A–11C illustrate a method for determining a faulty transmission line by using the attenuating pattern 3. FIG. 11A shows the power waveform of the reflected light under the same condition as in FIG. 9A. FIG. 11B shows the attenuating pattern 3.

The attenuation controller 9A causes attenuation to lines 5-1, . . . , 5-8 by on/off-controlling the attenuators 9-1, . . . , 9-8 according to the attenuating pattern 3 having an attenuation period (ATTEN P) peculiar to the lines 5-1, . . . , 5-8 as shown in FIG. 11B. In setting the attenuating pattern 3, synchronization is taken between the attenuators and the supervisory unit 6A in the same way as explained in connection with FIG. 9B.

FIG. 11C shows the power waveforms of the reflected-light pulse when a fault has occurred in transmission lines 5-3 and 5-5, as observed at the supervisory unit 6A. Accordingly, the supervisory unit 6A compares the time period (ATTEN P) in which the power of the reflected light is attenuated and the time period (ATTEN P) in which the attenuation has been caused to the lines 5-1, . . . , 5-8 and on a match, determines that the transmission lines 5-3 and 5-5 are faulty.

Figure 12A:
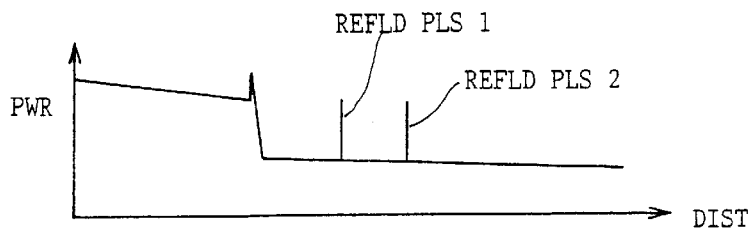
FIGS. 12A–12C illustrate a method for determining a faulty transmission line by using the attenuating pattern 4.
Figure 12B:
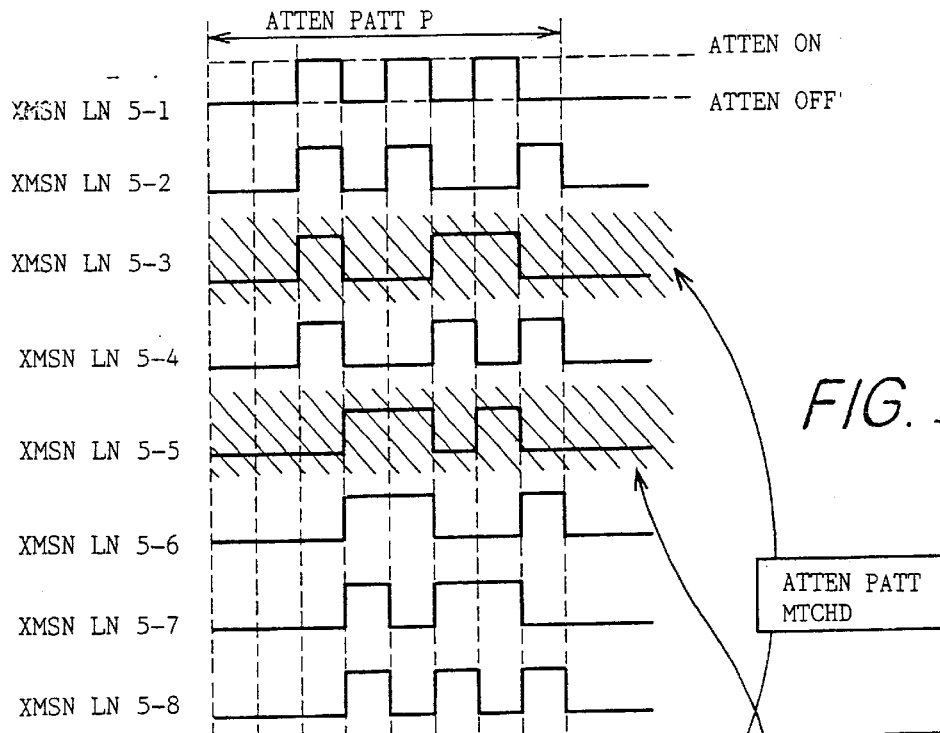
Figure 12C:
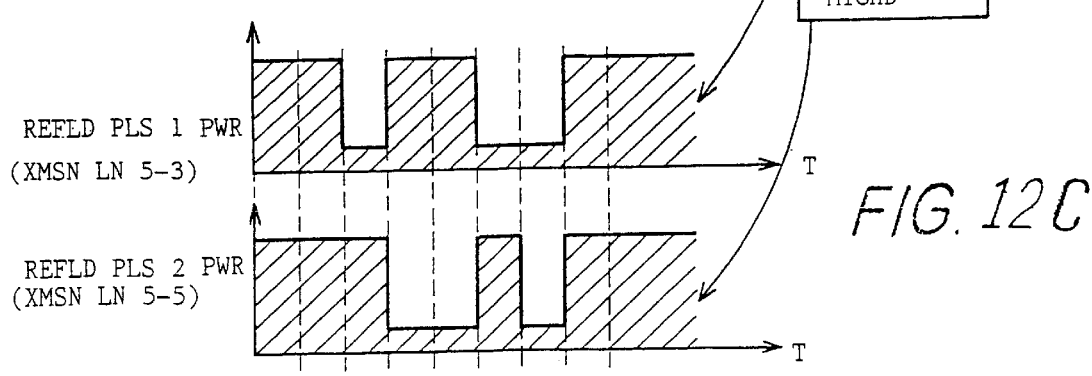

FIGS. 12A–12C illustrate a method for determining a faulty transmission line by using the attenuating pattern 4. FIG. 12A shows the power waveform of the reflected light under the same condition as in FIG. 9A. FIG. 12B shows the attenuating pattern 4.

The attenuation controller 9A causes attenuation to lines 5-1, . . . , 5-8 by on/off-controlling the attenuators 9-1, . . . , 9-8 according to the attenuating pattern 4 which is peculiar to the lines 5-1, . . . , 5-8 as shown in FIG. 12B. In setting the attenuating pattern, synchronization is taken between the attenuators and the supervisory unit 6A in the same way as explained in connection with FIG. 9B.

FIG. 12C shows the power waveforms of the reflected-light pulse when a fault has occurred in transmission lines 5-3 and 5-5, as observed at the supervisory unit 6A. Accordingly, the supervisory unit 6A compares the attenuated pattern (ATTEN PATT) of the reflected-light pulse with the attenuating pattern (ATTEN PATT) caused to the lines and on a match, determines that the lines 5-3 and 5-5 are faulty.

FIGS. 13A–13C illustrate a method for determining a faulty transmission line by using the attenuating pattern 5. FIG. 13A shows the power waveform of the reflected light under the same condition as in FIG. 9A. FIG. 13B shows the attenuating pattern 5, in which the amountof attenuation differs depending on the transmission lines 5-1, . . . , 5-8. The attenuation controller 9A causes attenuation to lines 5-1, . . . , 5-8 by controlling the attenuators 9-1, . . . , 9-8 according to the attenuating pattern 5 whose amount of attenuation is peculiar to the lines 5-1, . . . , 5-8 as shown in FIG. 13B.

FIG. 13C shows the power waveforms of the reflected-light pulse when a fault has occurred in transmission lines 5-3 and 5-5, as observed at the supervisory unit 6A. Accordingly, the supervisory unit 6A compares the amount of the attenuation (ATTEN AMT) of the reflected-light power with the amount of the attenuation (ATTEN AMT) caused to the lines 5-1, . . . , 5-8 and on a match, determines that the lines 5-3 and 5-5 are faulty since the reflected-light pulse differs in power depending on the transmission lines.

Moreover, combining the aforesaid attenuating patterns 1–5 properly may be able to determine a faulty transmission line more quickly and efficiently.

Figure 14:
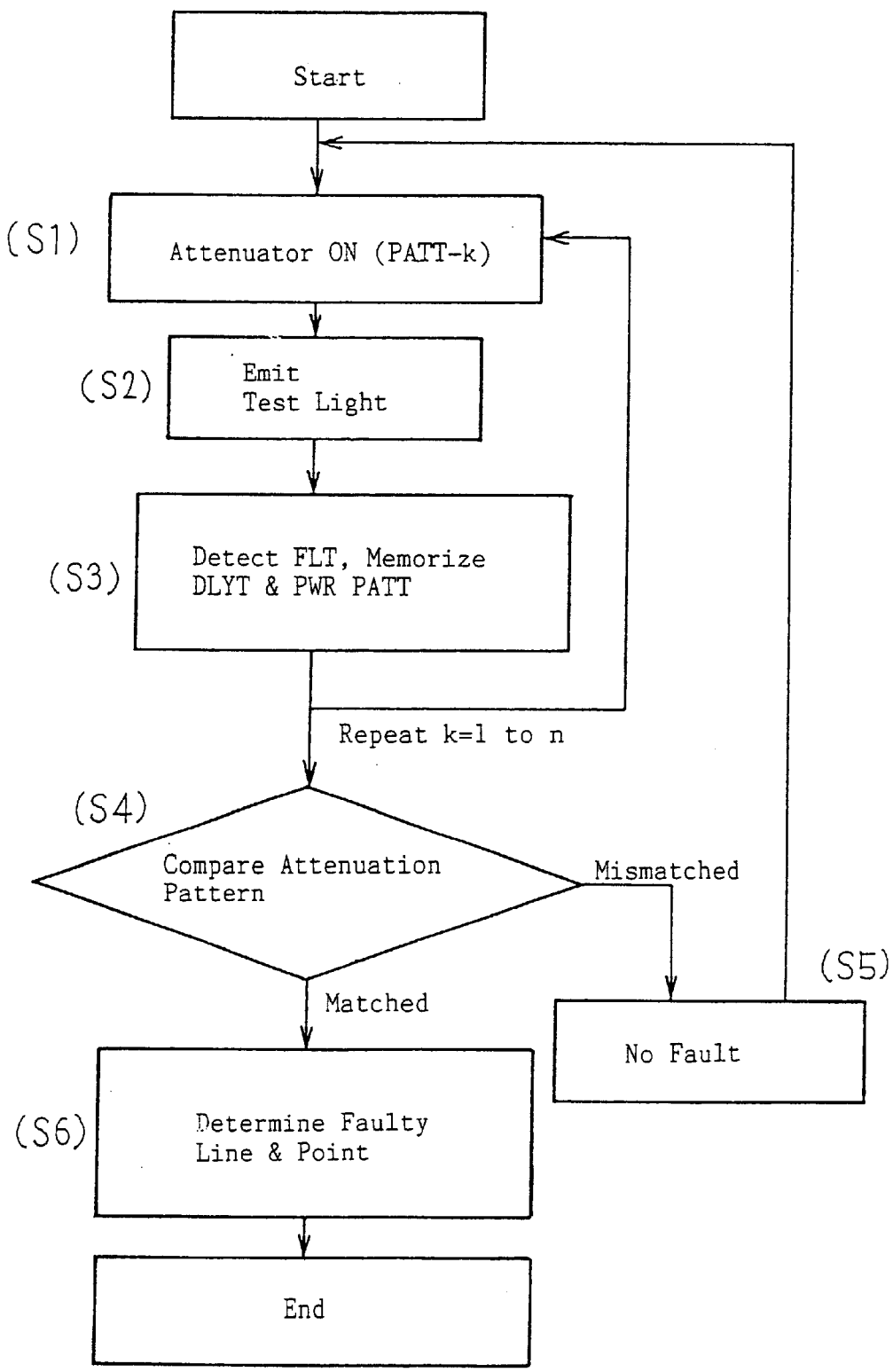
FIG. 14 is a flow chart illustrating a method for locating a fault in a transmission line according to the first embodiment of the present invention.

FIG. 14 is a flow chart illustrating a method for locating a fault in a transmission line according to the first embodiment of the present invention. The method is explained below by using the attenuating pattern 1 exemplified in FIG. 9B.

(S1) The attenuation controller 9AAn provides to each of attenuators 9-1, . . . , 9-8, an element k=1 of attenuating pattern 1, e.g., a combination of the attenuation-ON/OFFs in the row (1) of FIG. 9B.

(S2) The supervisory unit 6A emits a test-light pulse.

(S3) The supervisory unit 6A determines whether a fault exists in the transmission line by comparing the waveform of the reflected-light pulse with the waveform at the normal time and if a fault is detected, stores in the memory the aforesaid delay time and the pattern of the reflected-light pulse power. This operation is repeated until k=n is reached (n is the number of transmission lines, n=8 in the example of FIG. 9B), i.e., attenuation elements (1)–(8) are all set in the lines.

(S4) The supervisory unit 6A compares the attenuating pattern provided to transmission lines 5-1, . . . , 5-8 with the attenuated pattern of the reflected-light power.

(S5) When the comparison result is a mismatch, it is determined that there exists no fault in the transmission lines 5-1, . . . , 5-8 and the supervisory unit 6A repeats the above operation-concurrently with a usual user service operation in order to monitor the lines 5-1, . . . , 5-8.

(S6) When the comparison result is a match, the supervisory unit 6A determines a faulty transmission line and the distance to the fault point, based on the comparison result in S4 and the delay time stored in S3.

Figure 15:
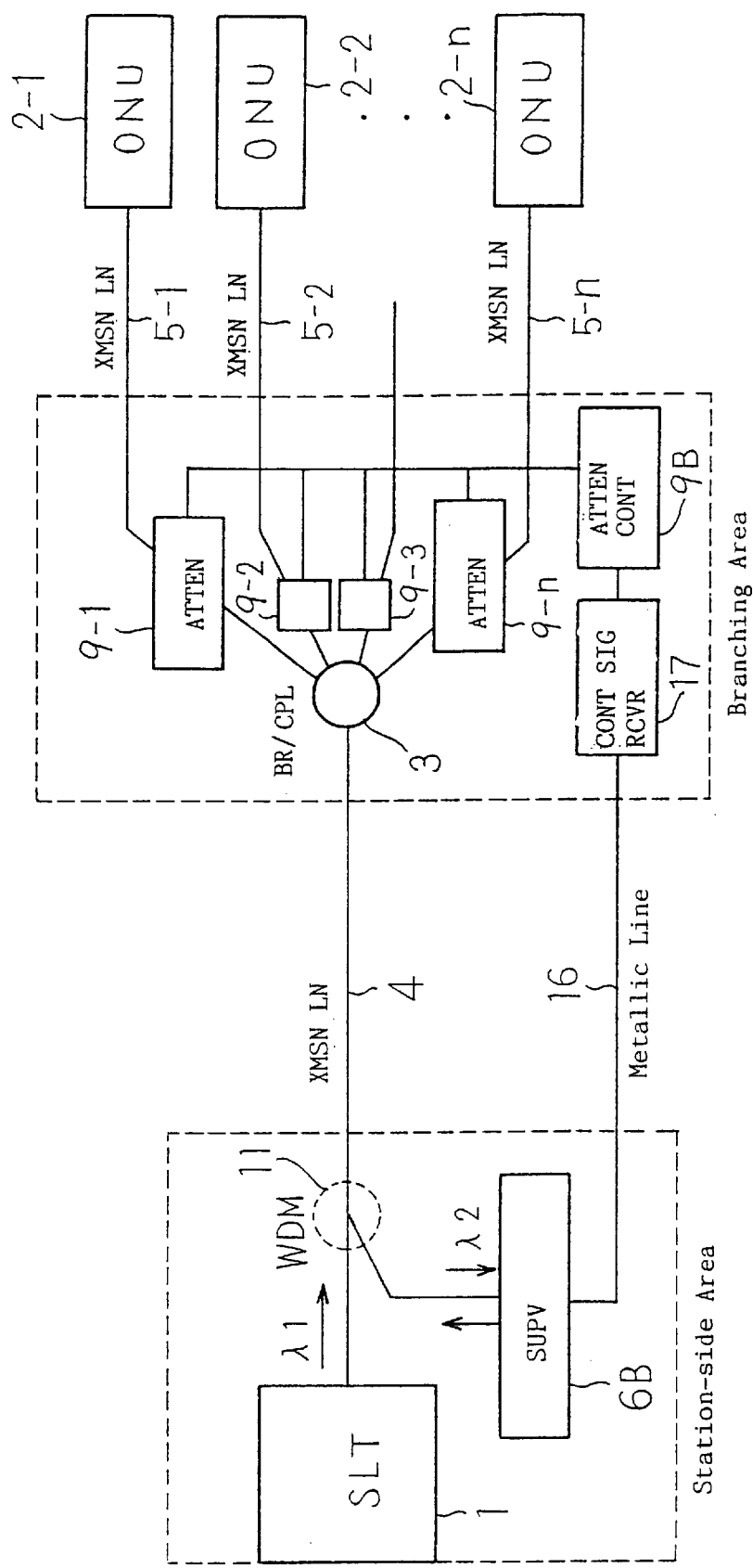
FIG. 15 shows a configuration of the supervising system according to the second embodiment of the present invention.

FIG. 15 shows a configuration of the supervising system according to the second embodiment of the present invention. The basic configuration is similar to that of the first embodiment.

A metallic wire 16 is provided to connect the supervisory unit 6B to the branching area. The supervisory unit 6B sends an attenuation control signal including timing for setting an attenuating pattern and a pattern number identifying the aforesaid attenuating pattern (see FIGS. 9B–13B), to an attenuation controller 9B through the metallic wire 16 and a control signal receiver (CONT SIG RCVR) 17. Based on the attenuation control signal, the attenuation controller 9B determines the timing and the attenuating pattern to be set in the attenuators 9-1, . . . , 9-8.

In the second embodiment, since the attenuators 9-1, . . . , 9-n are controlled by the attenuation control signal sent from the supervisory unit 6B, there is an advantage that a fault can be easily and quickly located by selectively changing the attenuating pattern according to fault conditions of the lines.

If the attenuators 9-1, . . . , 9-n are always or periodically operated, a heavy load may be imposed on the transmission lines in that the power level of the transmission lines fluctuates frequently due to the attenuation caused by the attenuators. In the second embodiment, however, after detecting a reflected light and recognizing a fault, the supervisory unit 6B can operate the attenuators 9-1, . . . , 9-n to locate the fault by utilizing the aforesaid advantage. Therefore, the time during which the transmission lines undergo attenuation can be shortened and the load imposed on the lines can be alleviated.

Figure 16:
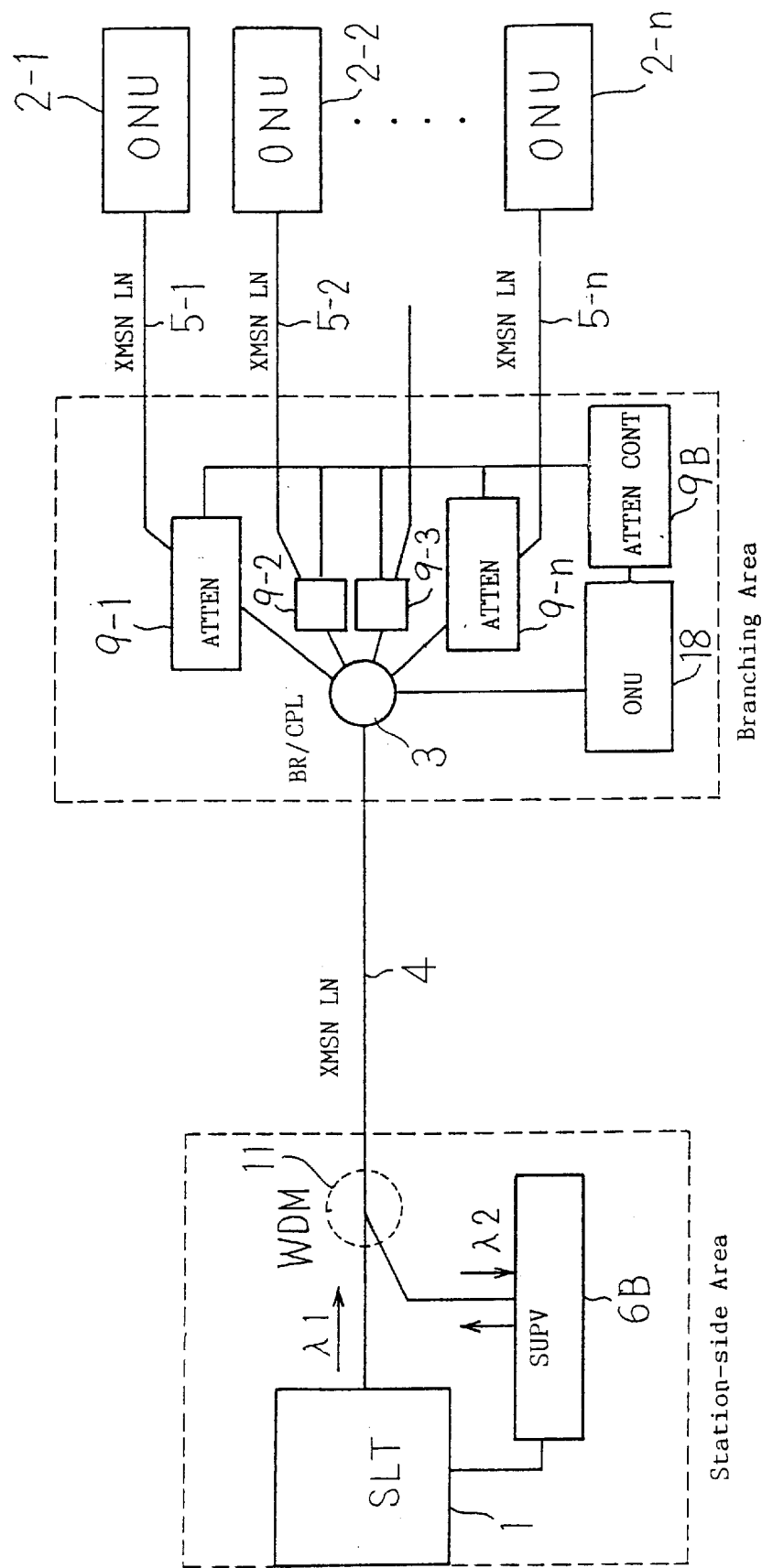
FIG. 16 shows a configuration of the supervising system according to the third embodiment of the present invention.

FIG. 16 shows a configuration of the supervising system according to the third embodiment of the present invention. The basic configuration is similar to that of the first embodiment. An ONU 18 for control use is provided in the branching area to receive the attenuation control signal via optical means from supervisory unit 6B. The supervisory unit 6B is connected with a station-side device (SLT) 1 via an electric cable.

The supervisory unit 6B sends an electric attenuation control signal to the station-side device 1 through the electric cable. The SLT 1 converts the electric signal into an optical signal of wavelength λ1 which is used for user services and transmits the thus-converted optical attenuation control signal along with the optical information signals for user services, to the subscriber devices ONUs 2-1, . . . , 2-n.

The ONU 18 receives the optical attenuation control signal, converts the signal into an electric signal and supplies to the attenuation controller 9B. Based on the attenuation control signal, the attenuation controller 9B determines the timing and the duration time for causing attenuation to each of the transmission lines 5-1, . . . , 5-n. Thus, since the attenuators are operated to locate a fault after the fault has occurred as in the second embodiment, the time when the transmission lines undergo attenuation is shortened and therefore, less load is imposed on the lines.

Further, since the attenuation control signal is transmitted using the optical transmission line carrying user data, there is no need to newly lay a metallic cable, etc. Still further, by allocating one of the frames for user use to transmit the attenuation control-signal from the station-side device 1, there is no need to newly provide a frame for the attenuation control signal.

Figure 17:
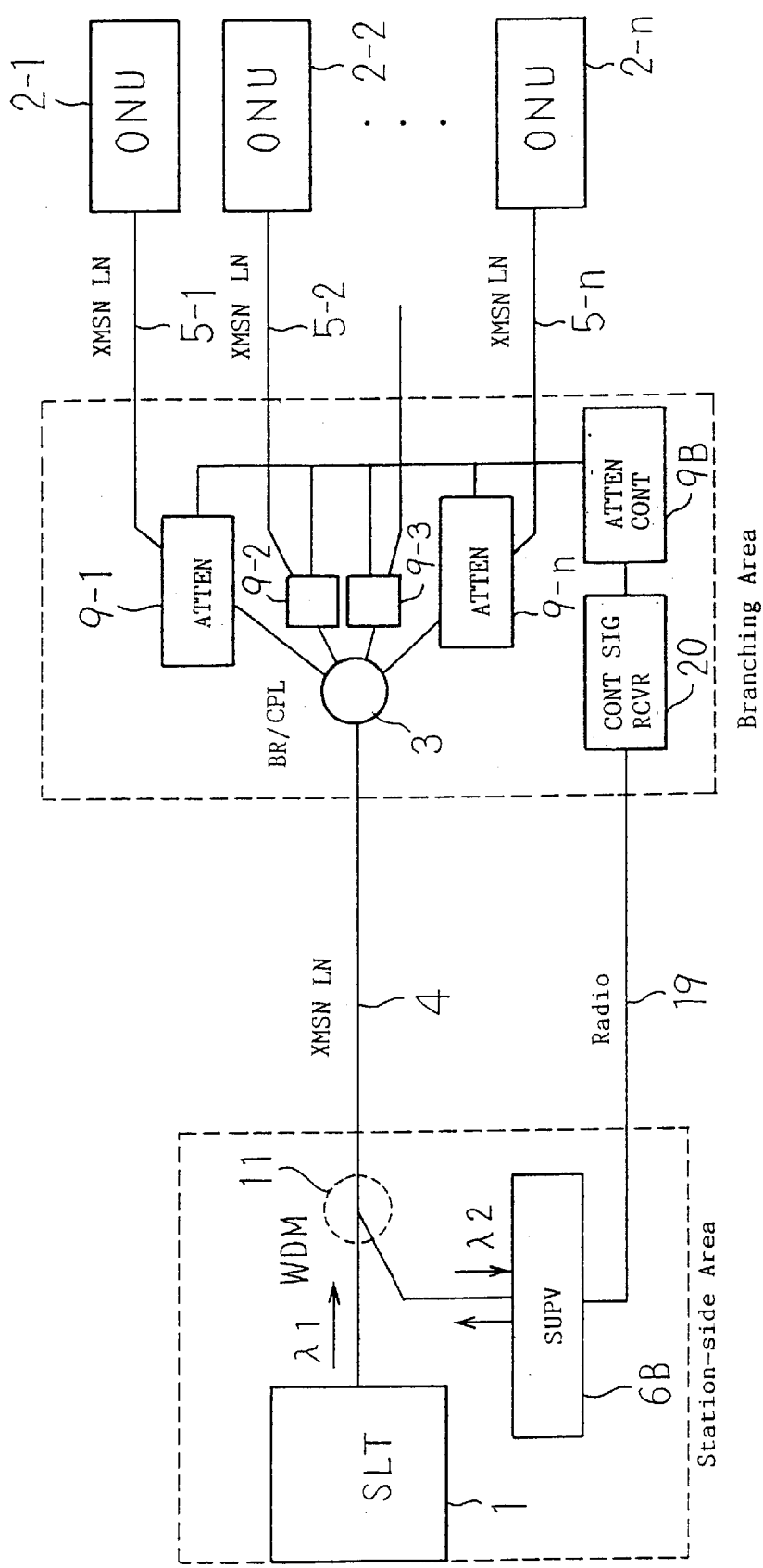
FIG. 17 shows a configuration of the supervising system according to the fourth embodiment of the present invention.

FIG. 17 shows a configuration of the supervising system according to the fourth embodiment of the present invention. The basic configuration is similar to that of the first embodiment.

The supervisory unit 6B sends an attenuation control signal including timing for setting the attenuation and a pattern number identifying the aforesaid attenuating pattern (see FIGS. 9B–13B), to an attenuation controller 9B via radio. A receiver unit (RCVR) 20 is provided in the branching area to receive the attenuation control signal from the supervisory unit 6B.

Based on the attenuation control signal, the attenuation controller 9B determines the timing and the duration time for causing attenuation to the transmission lines 5-1, . . . , 5-n. This embodiment, in which the attenuation control signal is transmitted via radio instead of a metallic wire, has the same advantage as the second embodiment.

Figure 18:
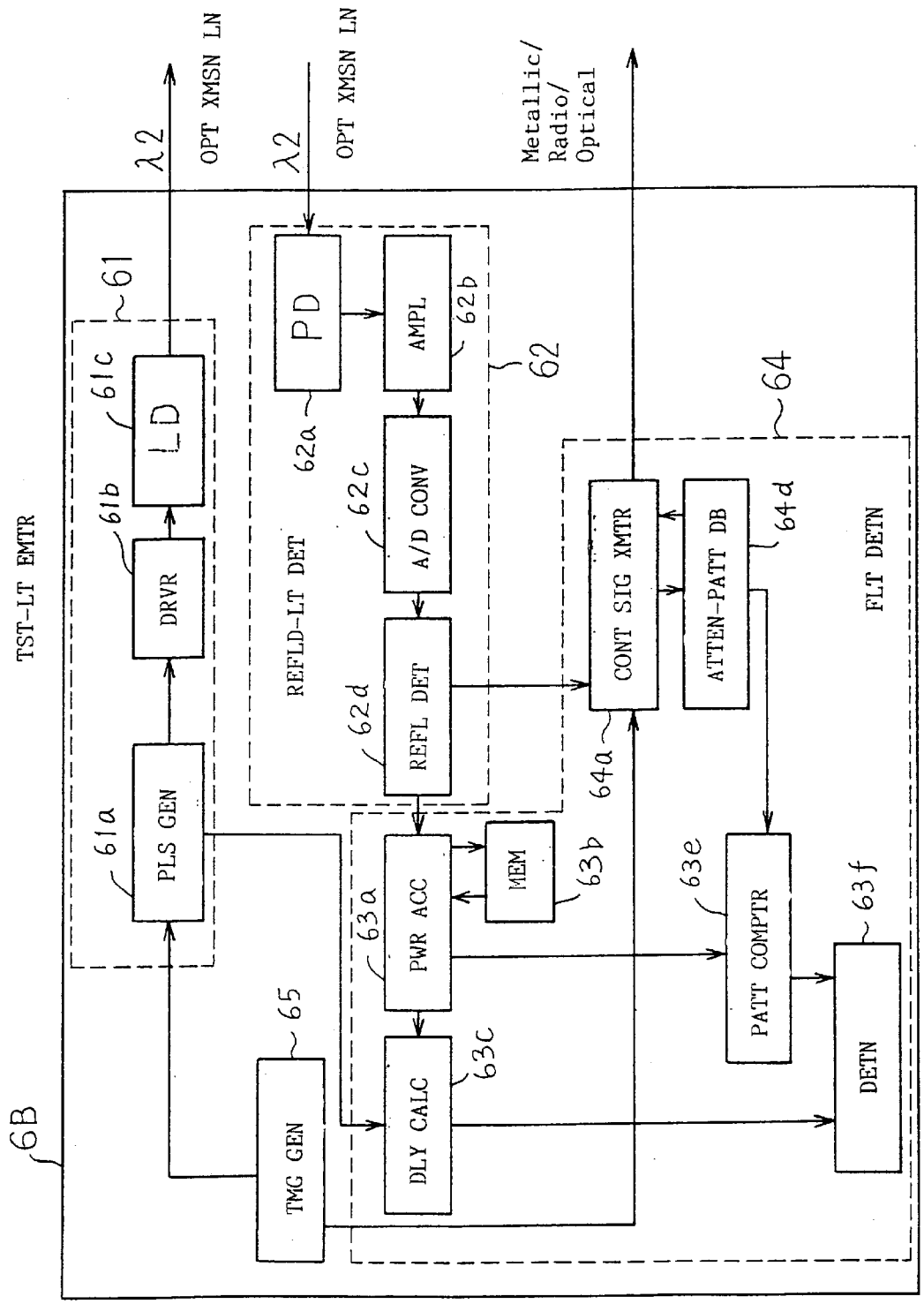
FIG. 18 is a block diagram of a supervisory unit of the second to fourth embodiment of the present invention.
Figure 19:
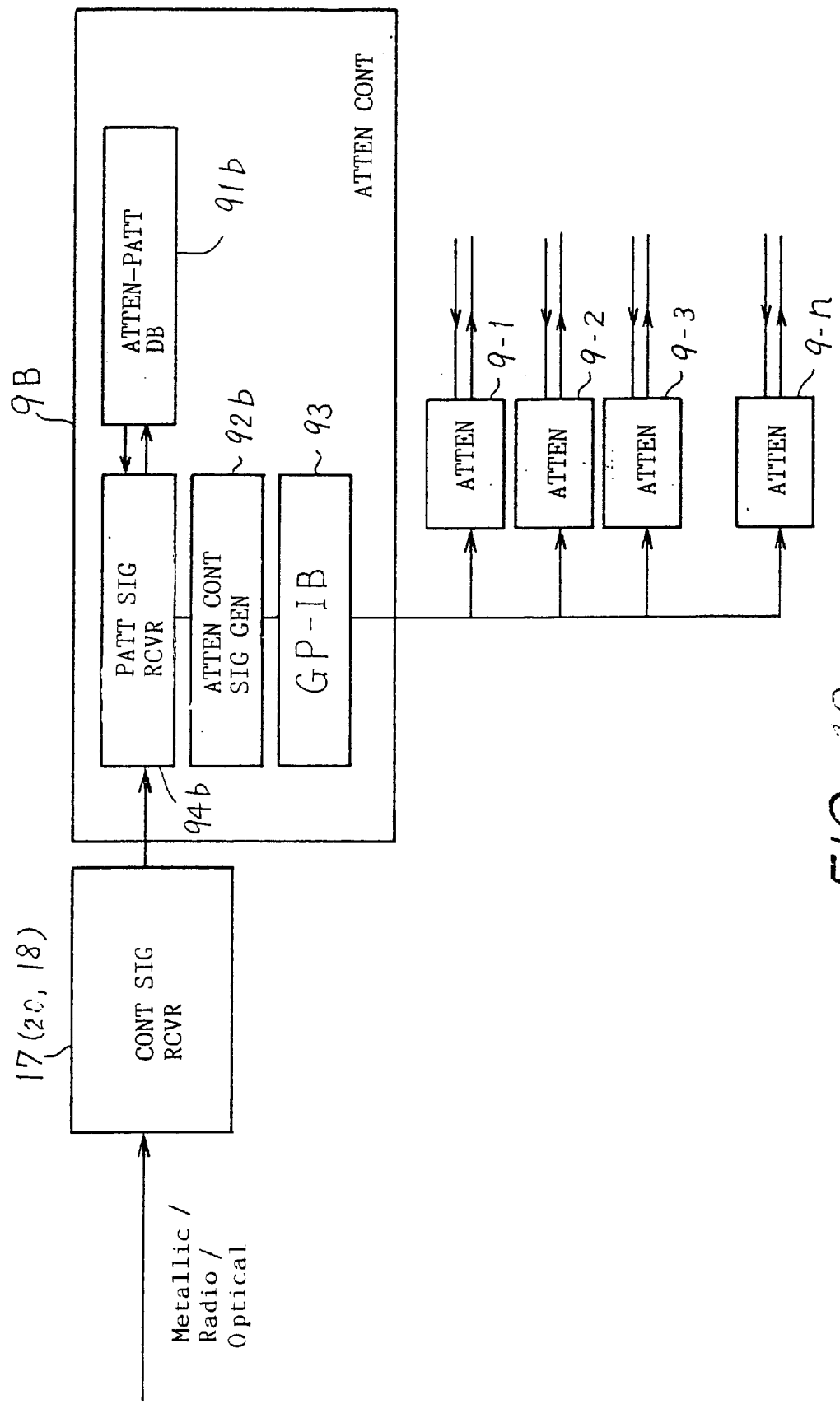
FIG. 19 is a block diagrams of an attenuation controller of the second to fourth embodiment of the present invention.
Figure 20:
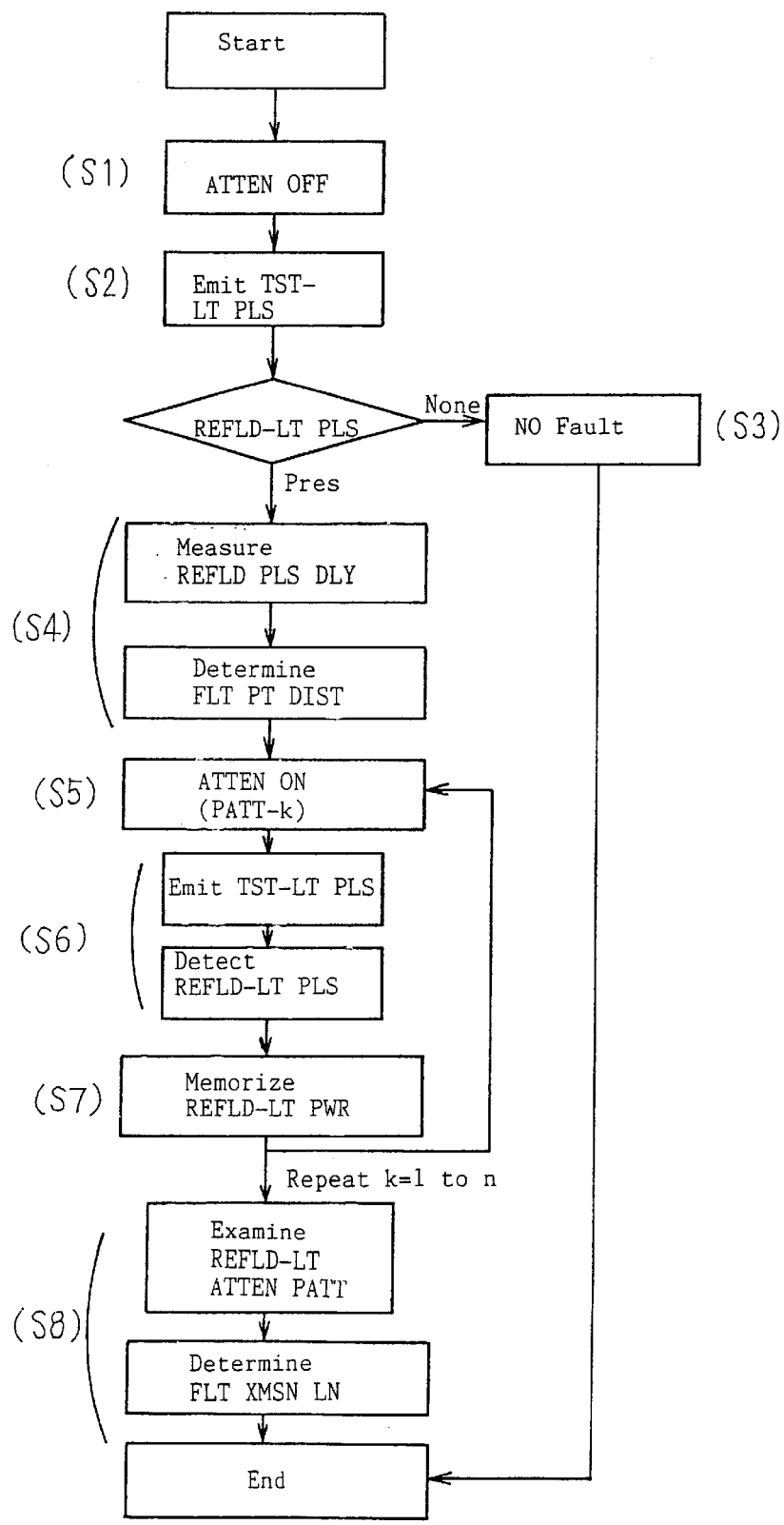
FIG. 20 is a flowchart illustrating a method for locating a fault in a transmission line according to the second to fourth embodiment of the present invention.

The supervising system of the second to fourth embodiment of the present invention is detailed referring to FIGS. 18–20. FIG. 18 and FIG. 19 are block diagrams of the supervisory unit and the attenuation controller, respectively of the second to fourth embodiment of the present invention. FIG. 20 is a flowchart illustrating a method for locating a fault in a transmission line according to the second to fourth embodiment of the present invention.

In FIG. 18, the supervisory unit 6B is composed roughly of a timing generator (TIM GEN) 65, a test-light emitter (TST-LT EMTR) 61, a reflected-light detector (REFLD-LT DET) 62 and a fault determiner (FLT DETN) 64. The timing generator 65 controls the overall synchronization of the system. The test-light emitter 61 and the reflected-light detector 62 each have the same-construction and function as the counterparts of the first embodiment (see FIG. 4).

The fault determiner 64, which is composed of a power accumulator (PWR ACC) 63a, a delay calculator (DLY CALC) 63c, a memory (MEM) 63b, an attenuating-pattern database (ATTEN-PATT DB) 64d, an attenuation-control-signal transmitter (CONT SIG XMTR) 64a, a pattern comparator (PATT COMPTR) 63e and a determiner (DETN) 63f, determines a faulty transmission line and the distance to a fault point based on the changes in power of the reflected light and on the timing of the changes.

When the reflection detector 62d of the reflected-light detector 62 detects a reflected-light pulse occurring in the transmission lines 5-1, . . . , 5-n, the attenuation-control-signal transmitter 64a transmits the aforesaid attenuation control signal for setting the attenuating pattern in the attenuators 9-1, . . . , 9-n, over a metallic wire, radio or optical line.

As in the first embodiment (see FIG. 4), the test-light pulse (wavelength λ2) emitted from the test-light emitter 61 is multiplexed with the optical user data signal (wavelength λ1) by the WDM 11 and transmitted to transmission lines 5-1, . . . , 2-n through the transmission line 4. The test-light pulse reflected at a fault point of the transmission lines 5-1, . . . , 5-n returns as a reflected-light pulse through the branching/coupling device 3 and the transmission line 4 and in the WDM 11, is demultiplexed from the user data signal to be supplied to the reflected-light detector 62.

In the fault determiner 64, the power accumulator 63a prepares the attenuated pattern of the reflected light by accumulating in memory 63b the reflected-light power which has been analog-to-digital converted in the reflected-light detector 62. The delay calculator 63c calculates the delay time from the time the test-light pulse is emitted until the reflected-light pulse is received and determines the distance to the fault point (i.e., the location where the reflected light is generated).

While the test-light pulses are repeatedly going to and from the fault point, the pattern signal transmitter 64a reads the attenuating pattern from the attenuating-pattern database 64d and transmits the attenuation control signal including attenuation-setting timing and a pattern number identifying the attenuating pattern, to the control signal receiver 17 (or 20) as an electric signal via a metallic wire (or radio) or to the ONU 18 as an optical signal via one of the transmission lines 5-1, . . . , 5-n (see FIGS. 15–17).

FIG. 19 is a block diagram of the attenuation controller of the second to fourth embodiment of the present invention.

The attenuation controller 9B is composed of a pattern signal receiver (PATT SIG RCVR) 94b, an attenuating-pattern database (ATTEN-PATT DB) 91b, an attenuator control signal generator (ATTEN CONT SIG GEN) 92b and an interface (named GP-IB) 93. The attenuation controller 9B sets the attenuating pattern in the attenuators 9-1, . . . , 9-n based on the attenuation control signal (attenuation setting timing and the pattern number identifying the attenuating pattern) transmitted from the supervisory unit 6B via a metallic wire 16, radio 19 or optical transmission line 4.

The attenuation control signal is received by the control signal receiver (CONT SIG RCVR) 17, 19 or the ONU 18 and is output to the pattern signal receiver (PATT SIG RCVR) 94b. The pattern signal receiver 94b reads the attenuating pattern from the attenuating-pattern database 91b based on the pattern number included in the attenuation control signal.

The attenuator control signal generator 92b generates an attenuator control signal based on the above-read attenuating pattern and outputs the attenuator-control signal to the attenuators 9-1, . . . , 9-n through the GP-IB 93 to cause individual attenuation to the lines 5-1, . . . , 5-n. In the second to fourth embodiment, the supervisory unit 6B can perform the fault locating operation by emitting a test-light pulse usually with all the attenuators not operated (turned off) and by operating the attenuators only when a reflected-light has been detected by the reflection detector 62d.

By turning on/of the attenuators 9-1, . . . , 9-n in synchronizing with a test-light pulse received, an attenuated pattern of the reflected-light pulse is generated and accumulated in the memory 63b. Accordingly, the pattern comparator 63e compares the thus-accumulated attenuated pattern of the reflected-light pulse power with the attenuating pattern which has been set in the attenuators. Therefore, based on the comparison result, the determiner 63f can determine a faulty transmission line.

FIG. 20 is a flowchart illustrating the method of locating a fault in transmission lines according to the second to fourth embodiment of the present invention.

(S1) The supervisory unit 6B starts the fault-locating operation with all the attenuators 9-1, . . . , 9-n turned off, i.e., without causing attenuation to the transmission lines 5-1, . . . , 5-n, (S2) emits a test-light pulse, and (S3) checks to see if a reflected-light pulse is present. If not, ends the operation, recognizing that a fault does not exist.

(S4) When a reflected-light pulse is present, the supervisory unit 6B measures the delay time from the time the test-light pulse is emitted until the reflected-light pulse is received to determine the distance to the fault point.

(S5) The supervisory unit 6B specifies to the attenuation controller 9B, an attenuating pattern (e.g., the pattern shown in FIG. 9B) by means of the attenuation control signal in order to cause individual attenuation to the lines 5-1, . . . , 2-n. The attenuation controller 9B sets the element k=1 of the specified attenuating pattern (e.g., a combination of the attenuation-ON/OFFs in row (1) in FIG. 9B) in the attenuators 9-1, . . . , 9-8.

(S6) The supervisory unit 6B emits a test-light pulse and receives a reflected-light pulse from the transmission lines 5-1, . . . , 2-n.

(S7) The supervisory unit 6B converts the power of the reflected-light pulse into a digital value and stores the value in the memory 63b to generate a reflected-light attenuated pattern. The steps S5–S7 is repeated until k=n (n is the number of transmission lines, n=8 in the example of FIG. 9).

(S8) The supervisory unit 6B compares the attenuating patterns set in the attenuators 9-1, . . . , 9-n with the reflected-light attenuated pattern stored in the memory 63b in step S7. When the comparison result is a mismatch, it is determined that there exists no fault. When the result is a match, it is determined that there exists a fault and the faulty transmission line is determined based on the reflected-light attenuated pattern.

As described above, the present invention needs only one supervisory unit 6A (6B) and allows the branching/coupling device 3 to be placed in the vicinity of subscribers (ONUs)- and connected with the supervisory unit 6A (6B) via only one transmission line 4. Thus, the present invention can decrease overall amount of system hardware and length of transmission lines as a whole and therefore, allows to construct a low-cost and reliable fault locating system and communication system as well.

The present invention can properly determine a faulty transmission line and precisely locate a fault point even if a fault occurs in plural transmission lines at the same time and even if a fault occurs in different lines at an equal distance from the supervisory unit.

Further, since the present invention supervises transmission lines by using a test signal, it can perform the fault-locating operation even when the system is not being brought into service. Still further, even when the system is being brought into service, the present invention can perform the fault-locating operation without disturbing the communication for user services by changing the attenuation within an allowable range of the known system light rate-of-change regulations. Furthermore, by starting the fault-locating operation to cause attenuation to the transmission lines after recognizing that a fault has occurred, the present invention imposes minimum load on the line.

What is claimed is:

1. An apparatus for locating a fault of a transmission line in a communication system including a first device which transmits and receives a signal via a first transmission line, a plurality of second devices and a branching/coupling device which branches the first transmission line into a plurality of second transmission lines each connected with the respective second devices, wherein the first device and the plurality of second devices perform bidirectional communication, said apparatus comprising:

attenuation means for causing individual attenuation to the plurality of second transmission lines; and determination means for outputting a test signal to the first transmission line and detecting a reflected signal of the test signal, for determining a distance to a fault point based on the time since the test signal is output until the reflected signal is detected and for comparing, for each of the second transmission lines, the attenuation caused by said attenuation means with attenuation of the reflected signal and based on the comparing, determining a faulty one of the second transmission lines.

2. An apparatus for locating a fault of a transmission line in a communication system including a first device which transmits and receives a signal via a first transmission line, a plurality of second devices and a branching/coupling device which branches the first transmission line into a plurality of second transmission lines each connected with the respective second devices, wherein the first device and the plurality of second devices perform bidirectional communication, said apparatus comprising:

attenuation means for causing individual attenuation to the plurality of second transmission lines based on a specified attenuation condition; and determination means for specifying to said attenuation means the attenuation condition including timing for causing attenuation to the second transmission lines, outputting a test signal to the first transmission line and detecting a reflected signal of the test signal, for determining a distance to a fault point based on the time since the test signal is output until the reflected signal is detected and for comparing, for each of the second transmission lines, the attenuation caused by said attenuation means with attenuation of the reflected signal and based on the comparing, determining a faulty one of the second transmission lines.

3. The apparatus claim 1, wherein the first transmission line and the plurality of second transmission lines are optical transmission lines, and wherein the first device, the plurality of second devices, the branching/coupling device, said attenuation means and said determination means transmit and receive optical signals through the optical transmission lines.

4. The apparatus according to claim 3,
wherein said determination means specifies the attenuation condition by an optical signal which is transmitted through the optical transmission lines.

5. The apparatus according to claim 4,
wherein said determination means specifies the attenuation condition by using a time slot of a time division multiplexing method.

6. The apparatus according to claim 3,
wherein said determination means outputs an optical test signal of a wavelength differing from a wavelength of the optical signals used in the communication between the first device and the plurality of second devices.

7. The apparatus claim 1,
wherein said attenuation means executes, for each of the second transmission lines, an operation to cause attenuation to only one of the second transmission lines for a predetermined period of time.

8. The apparatus claim 1,
wherein said attenuation means causes attenuation to each of the second transmission lines for a period of time determined by a starting time and a duration time which differs with the second transmission lines.

9. The apparatus claim 1,
wherein said attenuation means causes attenuation to each of the second transmission lines for a period of time which differs with the second transmission lines.

10. The apparatus claim 1,
wherein said attenuation means causes a combination of presence and absence of attenuation to each of the second transmission lines.

11. The apparatus claim 1,
wherein said attenuation means causes different amounts of attenuation to the respective second transmission lines.

12. The apparatus according to claim 2,
wherein said determination means further specifies individual attenuation to be caused to the plurality of second transmission lines as the attenuation condition.

13. The apparatus according to claim 2,
wherein said determination means specifies the attenuation condition by a metallic signal line or a radio signal.

14. A method for locating a fault of a transmission line in a communication system in which a first device is connected to a branching/coupling device and thence separately to a plurality of second devices, said method comprising the steps of:
causing individual attenuation to a plurality of transmission lines respectively connecting the branching/coupling device to the second devices;
outputting a test signal in a transmission line connecting the first device to the branching/coupling device; and
locating a fault of the second transmission lines based on a delay time the test signal returns as a reflected signal and based on attenuation of the reflected signal.

15. A method for locating a fault of a transmission line in a communication system including a first device which transmits and receives a signal via a first transmission line, a plurality of second devices and a branching/coupling device which branches the first transmission line into a plurality of second transmission lines each connected with the respective second devices, wherein the first device and the plurality of second devices perform bidirectional communication, said method comprising the steps of:
(a) causing individual attenuation to the plurality of second transmission lines;
(b) outputting a test signal to the first transmission line and detecting a reflected signal of the test signal;
(c) determining a distance to a fault point based on the time since outputting the test signal in step (b) until detecting the reflected signal in step (b); and
(d) comparing, for each of the second transmission lines, the attenuation caused in step (a) with attenuation of the reflected signal detected in step (b) and based on the comparing, determining a faulty one of the second transmission lines.

16. A method for locating a fault of a transmission line in a communication system including a first device which transmits and receives a signal via a first transmission line, a plurality of second devices and a branching/coupling device which branches the first transmission line into a plurality of second transmission lines each connected with the respective second devices, wherein the first device and the plurality of second devices perform bidirectional communication, said method comprising the steps of:
(a) specifying an attenuation condition including timing for causing attenuation to the second transmission lines;
(b) causing individual attenuation to the plurality of second transmission lines based on the attenuation condition specified in step (a);
(c) outputting a test signal to the first transmission line and detecting a reflected signal of the test signal;
(d) determining a distance to a fault point based on the time since outputting the test signal in step (c) until detecting the reflected signal in step (c); and
(e) comparing, for each of the second transmission lines, the attenuation caused in step (b) with attenuation of the reflected signal detected in step (c) and based on the comparing, determining a faulty one of the second transmission lines.

* * * * *